Figure 1:
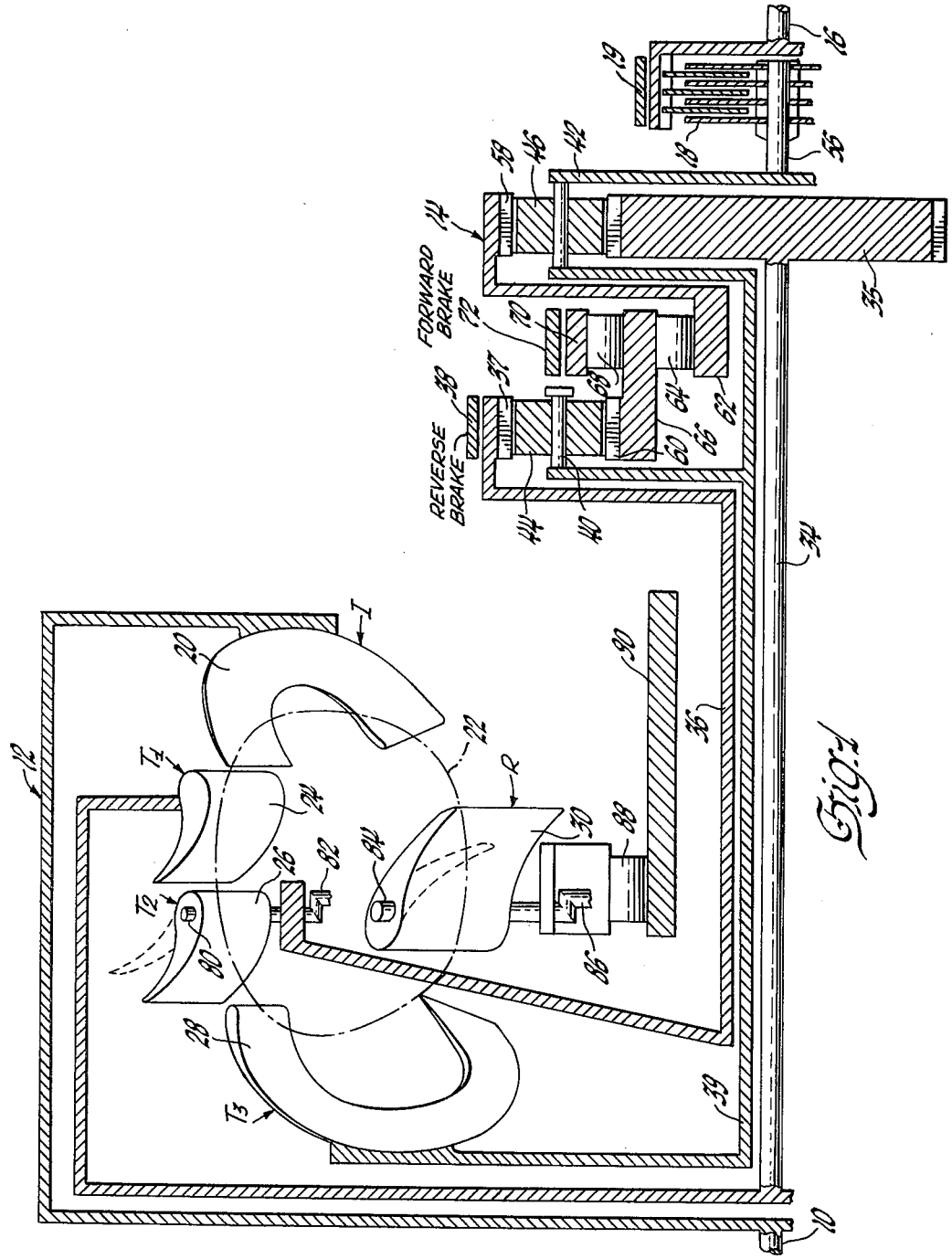

March 29, 1966  O. K. KELLEY  3,242,677
TRANSMISSION

Filed Sept. 29, 1955  12 Sheets-Sheet 1

INVENTOR
Oliver K. Kelley
BY
T. L. Chisholm
ATTORNEY

March 29, 1966  O. K. KELLEY  3,242,677
TRANSMISSION
Filed Sept. 29, 1955  12 Sheets-Sheet 2
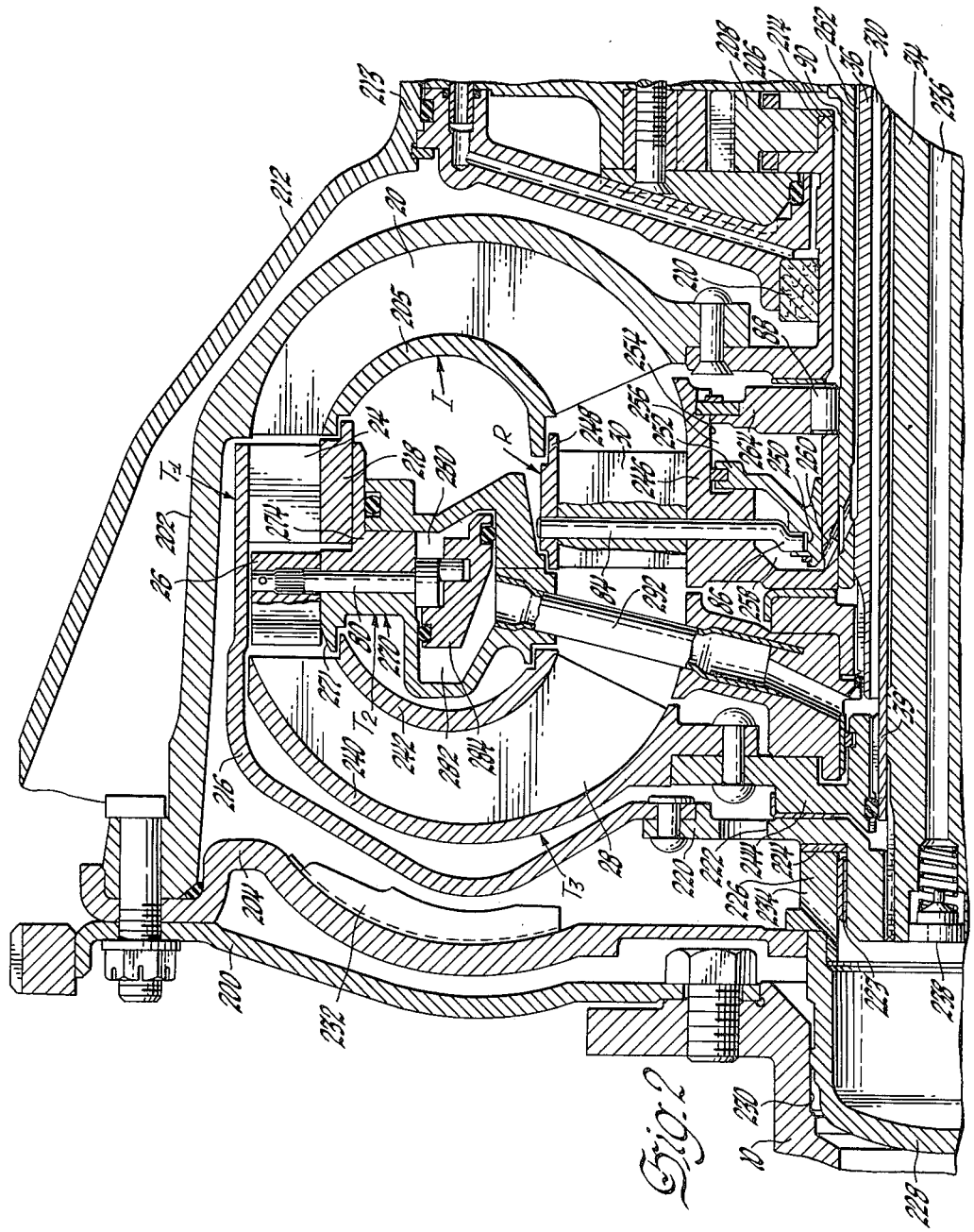
INVENTOR.
Oliver K. Kelley
BY
T. L. Chisholm
ATTORNEY

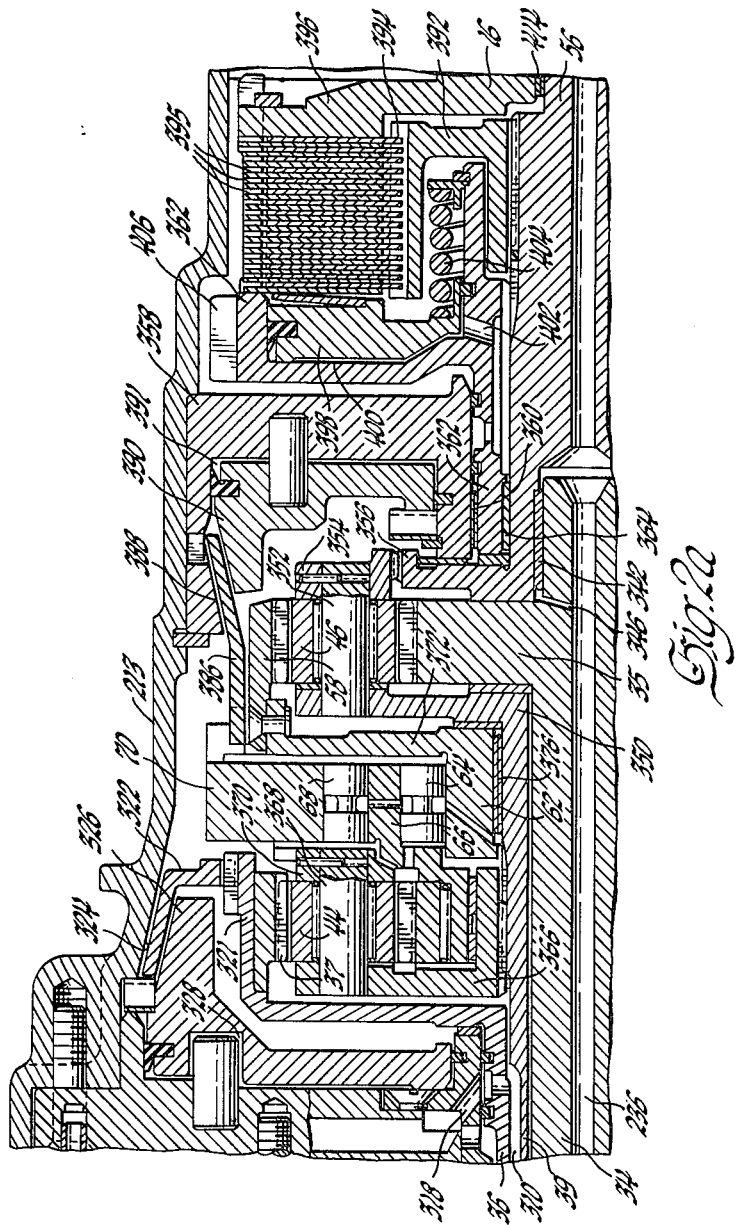

March 29, 1966
O. K. KELLEY
3,242,677
TRANSMISSION
Filed Sept. 29, 1955
12 Sheets-Sheet 4
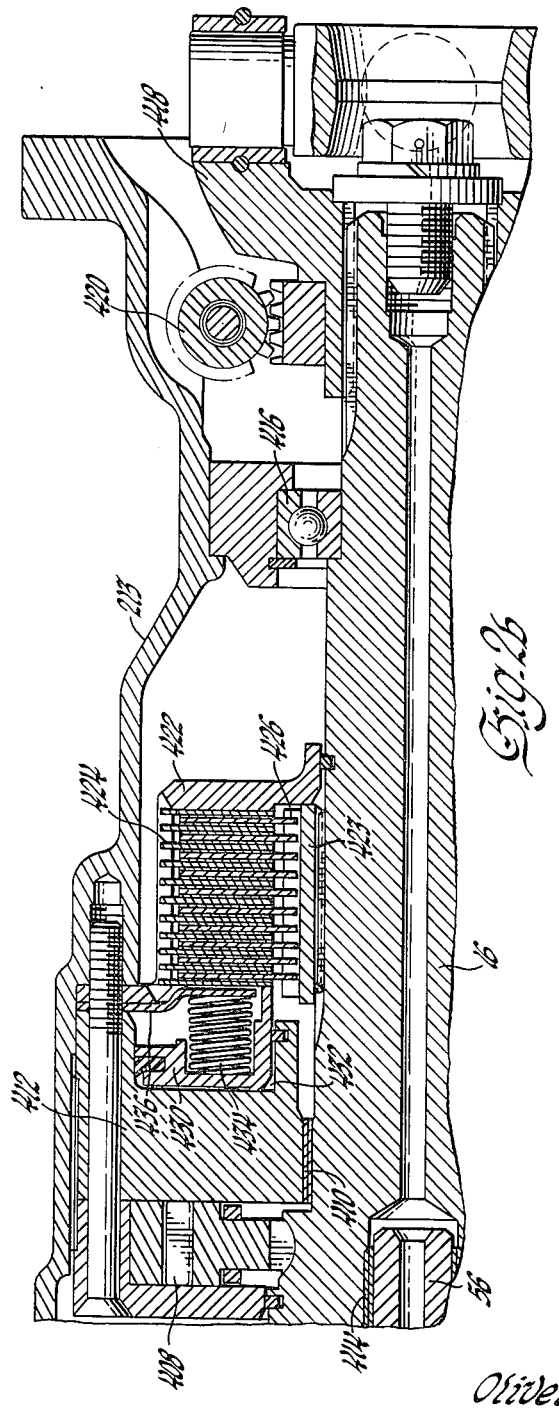
INVENTOR.
Oliver K. Kelley
BY
T. L. Chisholm
ATTORNEY

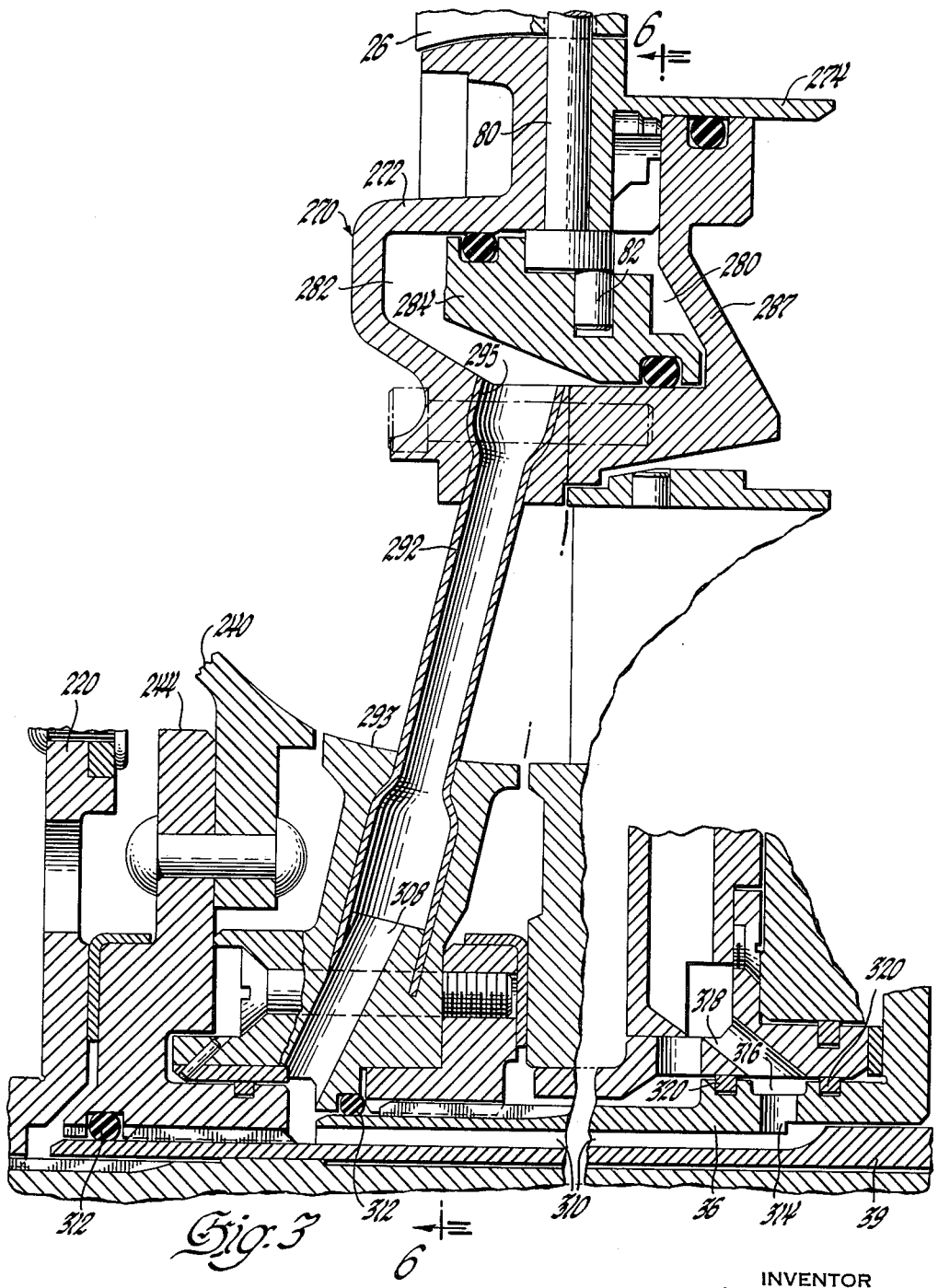

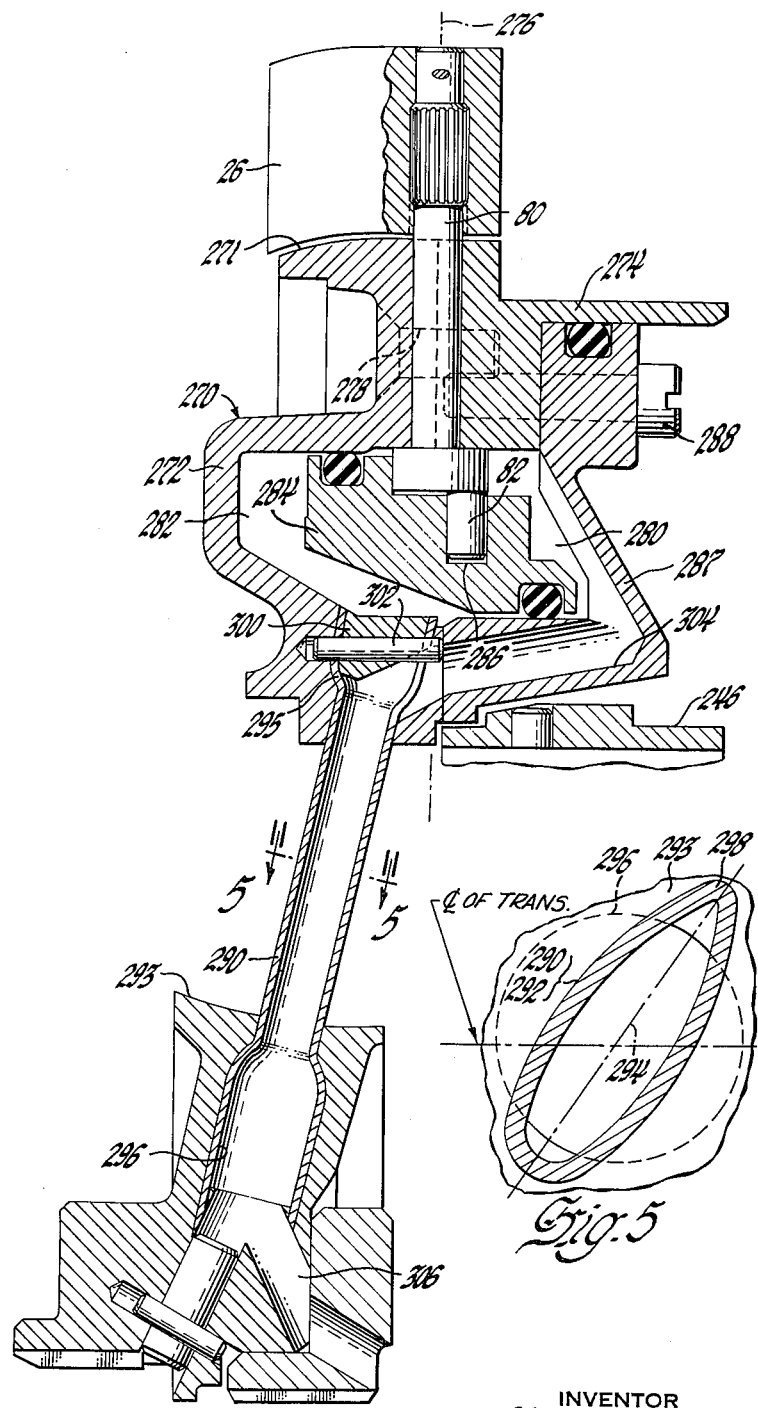

March 29, 1966  O. K. KELLEY  3,242,677
TRANSMISSION
Filed Sept. 29, 1955  12 Sheets-Sheet 7

INVENTOR
Oliver K. Kelley
BY
T. L. Chisholm
ATTORNEY

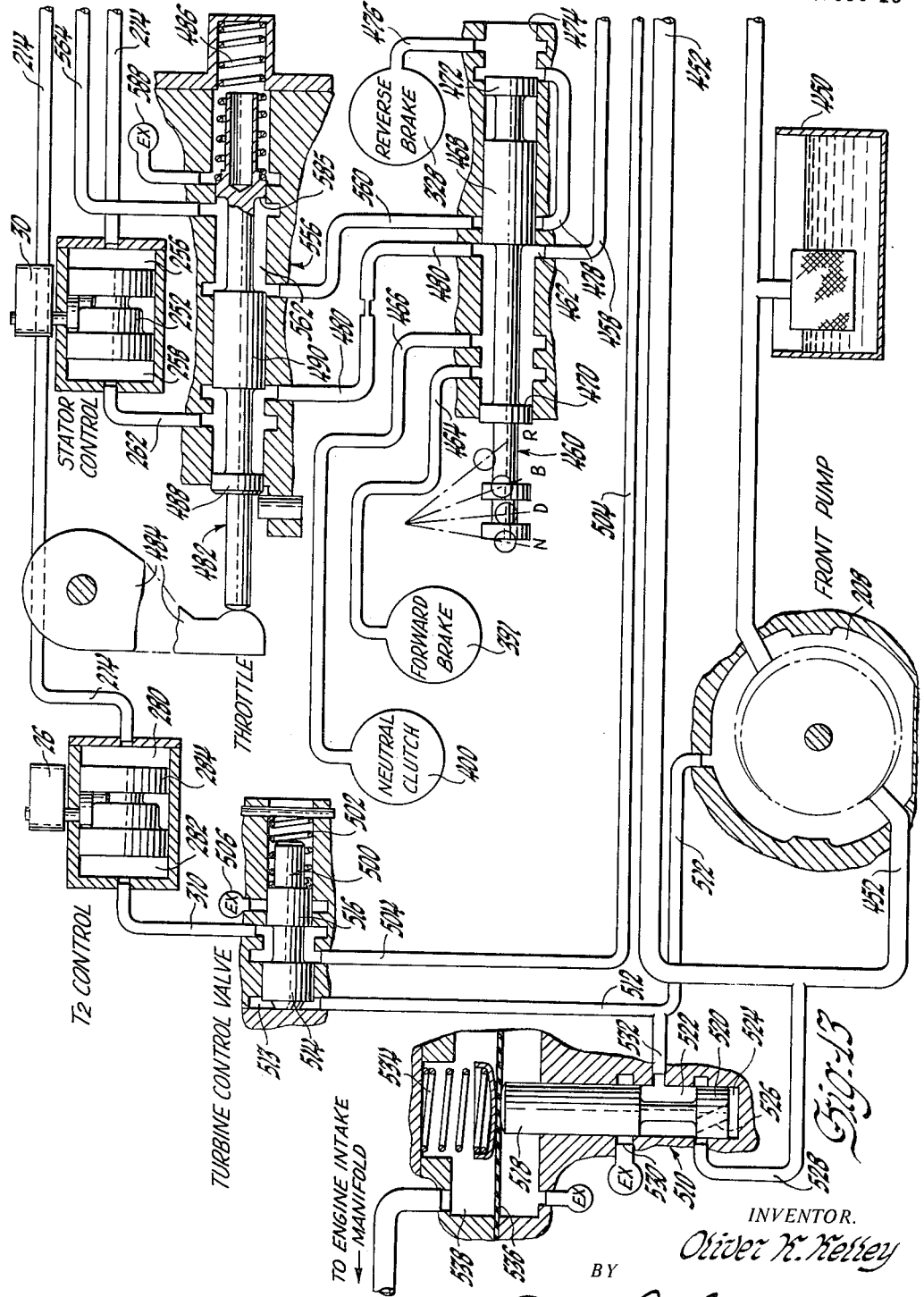

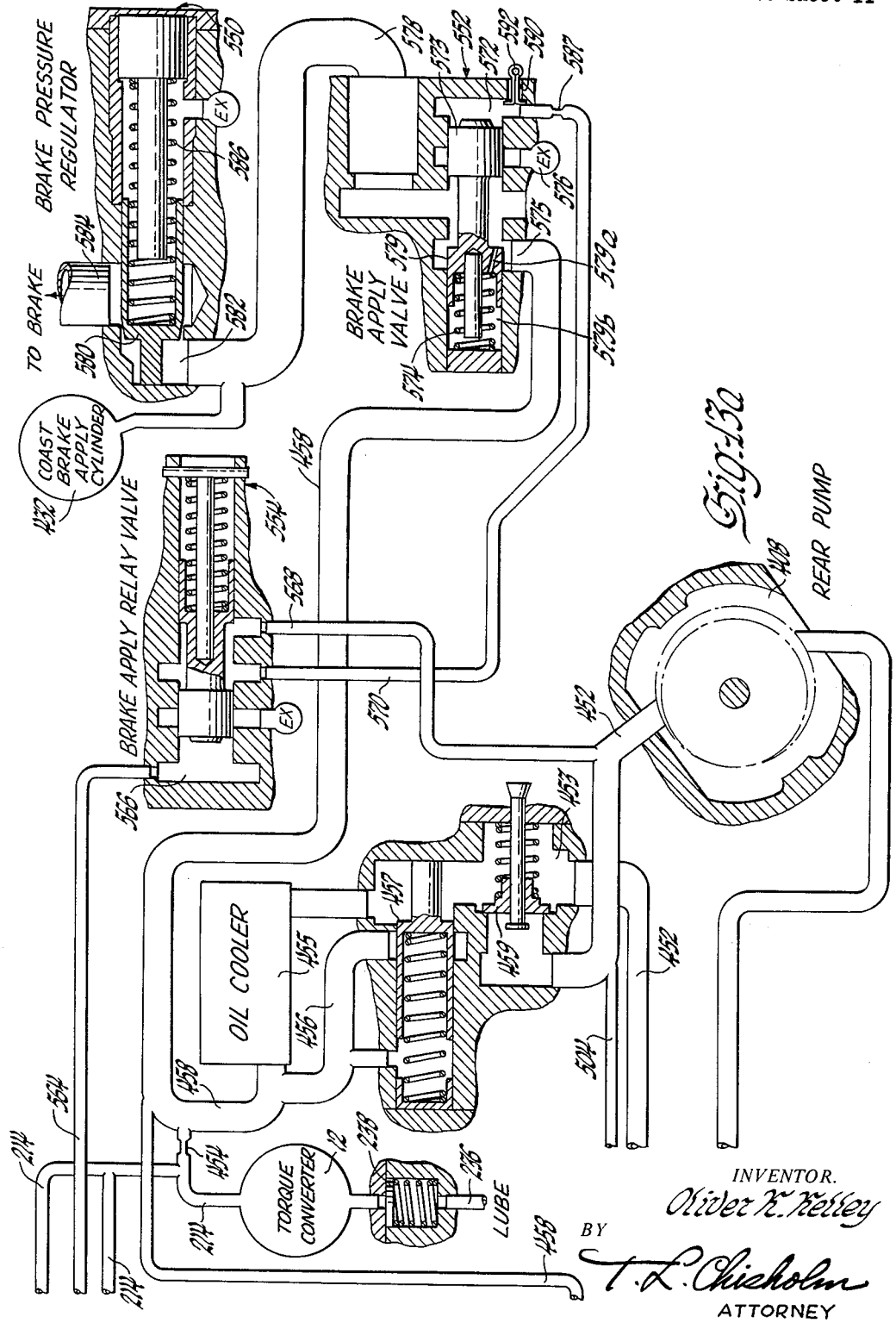

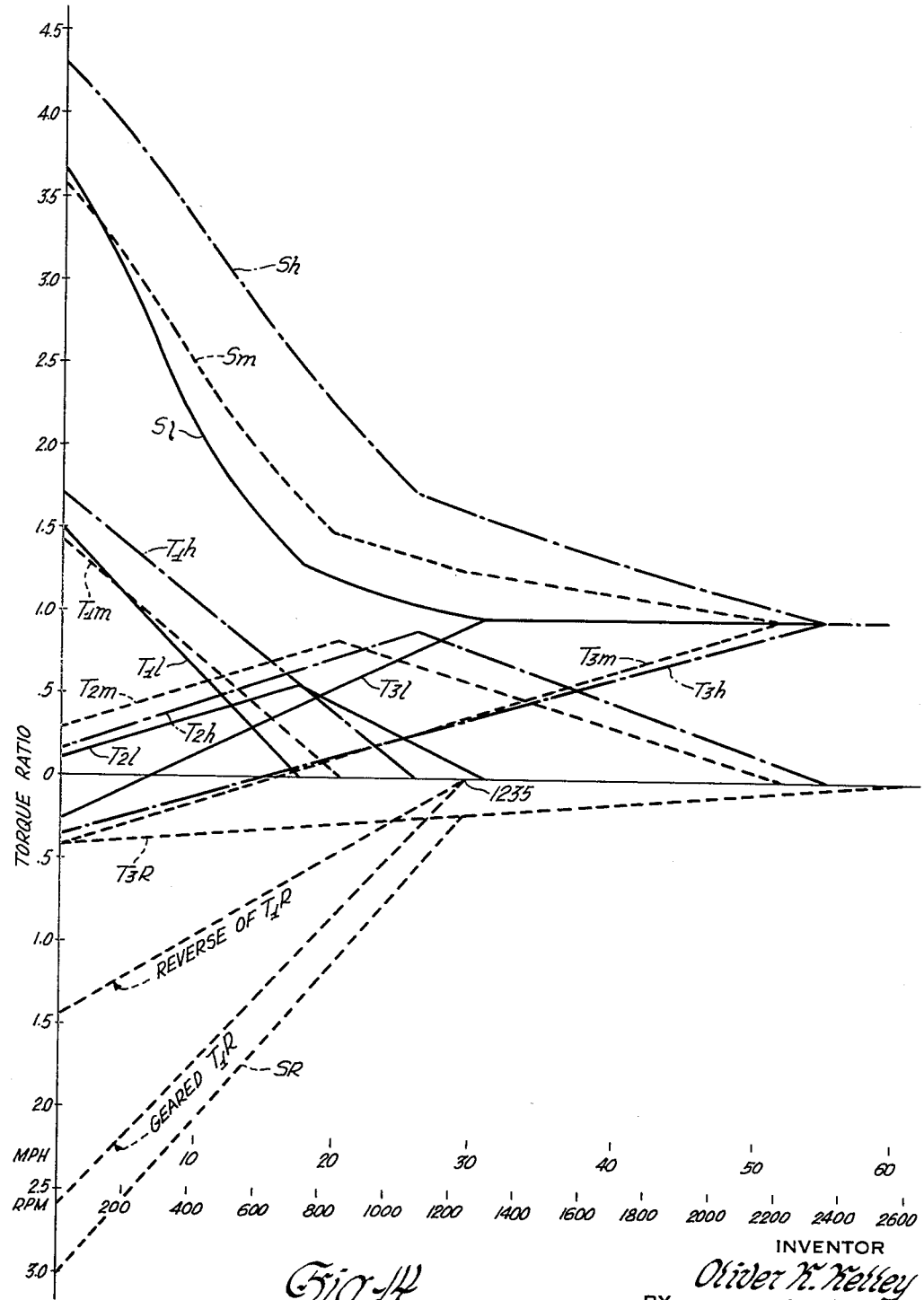

United States Patent Office 3,242,677
Patented Mar. 29, 1966

3,242,677
TRANSMISSION
Oliver K. Kelley, Bloomfield Hills, Mich., assignor to General Motors Corporation, Detroit, Mich., a corporation of Delaware
Filed Sept. 29, 1955, Ser. No. 537,472
17 Claims. (Cl. 60—54)

This invention relates to improvements in arrangements of hydrodynamic torque transfer and/or multiplying devices and associated gearing for driving a power output member at various speed ratios from a power input member. These are particularly, although not exclusively, suited to motor vehicle transmissions, and such a transmission is described herein as one example of a device to which my invention may be applied. Also, the invention is especially adapted to hydrodynamic torque converters or speed reducers which multiply torque, but some features of the invention are applicable to transmissions generally.

In hydrodynamic torque converters a turbine can readily be constructed to provide any practical degree of torque multiplication on starting, but if the degree of starting torque multiplication is sufficiently high, the torque supplied by the turbine decreases rapidly as the turbine starts to turn, and vanishes at an impractically low turbine speed. This provides poor acceleration and may furnish little or no torque as the device approaches coupling or one-to-one speed ratio. On the other hand, a turbine can be constructed to provide acceptable coupling characteristics if or when the load reaches approximate impeller speed, but this is done at a sacrifice of starting or stall torque and accelerating torque in the middle ranges of speed.

The foregoing considerations have led to the design and construction of hydrodynamic torque transfer devices, especially torque converters having various arrangements of multiple turbines of varying torque characteristics with or without torque multiplying gearing. Many of those proposed or constructed operate satisfactorily within inherent limitations which it has heretofore beem impractical to avoid, and their disadvantages include inadequate maintaining of torque multiplication during intermediate speed ranges, and the impossibility of obtaining adequate torque multiplication in these ranges. These have produced cars which have been sluggish in performance after starting and cars in which it has been impractical to obtain a so-called passing gear, by which is meant the ability to provide a spurt of high acceleration when running at moderate or high speed. Such known devices frequently have been of low efficiency requiring high operating costs.

My invention seeks to overcome these and other disadvantages of known hydrodynamic transmissions and to provide a transmission which changes torque ratio smoothly and continuously, that is by infinitely small increments without shifting of mechanical torque multiplying devices such as gears. It seeks to improve the efficiency of torque converters and to provide a hydrodynamic torque converter which has a high starting torque ratio, and maintains a higher torque ratio than was formerly had during acceleration to one-to-one drive. The invention also seeks to provide improved and simplified means for increasing the range of torque ratio at any speed, manually or automatically in response to torque demand on the engine (for example when starting or when in reverse), or both.

Any converter turbine has the inherent characteristic of providing diminishing torque multiplication as the turbine speed increases toward impeller speed, as long as the turbine is operating alone, by which I mean that there is no other turbine ahead of the turbine in question in the liquid stream from the impeller, which other turbine is delivering torque. I combine a series of such turbines, of different torque characteristics, in such a way that as the torque multiplication or torque ratio of one turbine decreases the torque multiplications of downstream turbines increase. By providing a sufficient number of such turbines, while the turbines of the series are successively fading out, that is their torque multiplications are decreasing toward zero, the downstream turbines are increasing their torque ratios so that the torque ratio of the torque converter as a whole decreases toward coupling much more slowly than heretofore, and stays at practically high values over long periods of acceleration of the vehicle. This provides a maneuverable vehicle of high performance, which is very desirable in present day driving conditions.

Preferably, I combine a series of axial flow turbines with a radial inflow turbine and connect each turbine to an output shaft by a mechanical connection having a lower mechanical advantage than that of the connections of the preceding turbine of the series. Preferably also, the connection of the final or radial inflow turbine is direct and the connections of all the other turbines are free-wheeling. In this way during acceleration of the car each turbine runs faster than the next turbine downstream, and as each turbine, except the last, approaches its terminal speed and its torque consequently vanishes, that turbine is disconnected from the output shaft, and is free to float or turn idly in the oil stream, neither putting out torque nor taking up any significant amount. For all practical purposes, except for factors such as friction losses each free-wheeling turbine may be considered as removed from the transmission.

I also provide means for increasing the range of torque ratio of the converter at any car speed to provide sudden spurts of higher torque ratio for acceleration in emergencies or for a passing gear. This may be done, for example, by increasing the angle of the blades of one or more of the turbines, or by increasing the angle of the reaction blades, or both.

Increasing the angles of the blades can also be used to reduce the volume of flow in the converter when the engine is idling, in order to prevent creep of the car when the car is supposed to stand still.

The invention also includes improved arrangements of gearing especially helpful in achieving the foregoing objects.

Driving in present day traffic congestion frequently requires alternately rapid acceleration followed immediately by sharp braking. This makes high demands on the service brakes of the car and the physique of the driver. The invention includes an improved and independent car brake and a braking control which is so combined with the transmission control that the controls may be set either automatically to apply the brake, or not, whenever deceleration is desired, for example whenever the engine throttle is closed.

Figure 6:
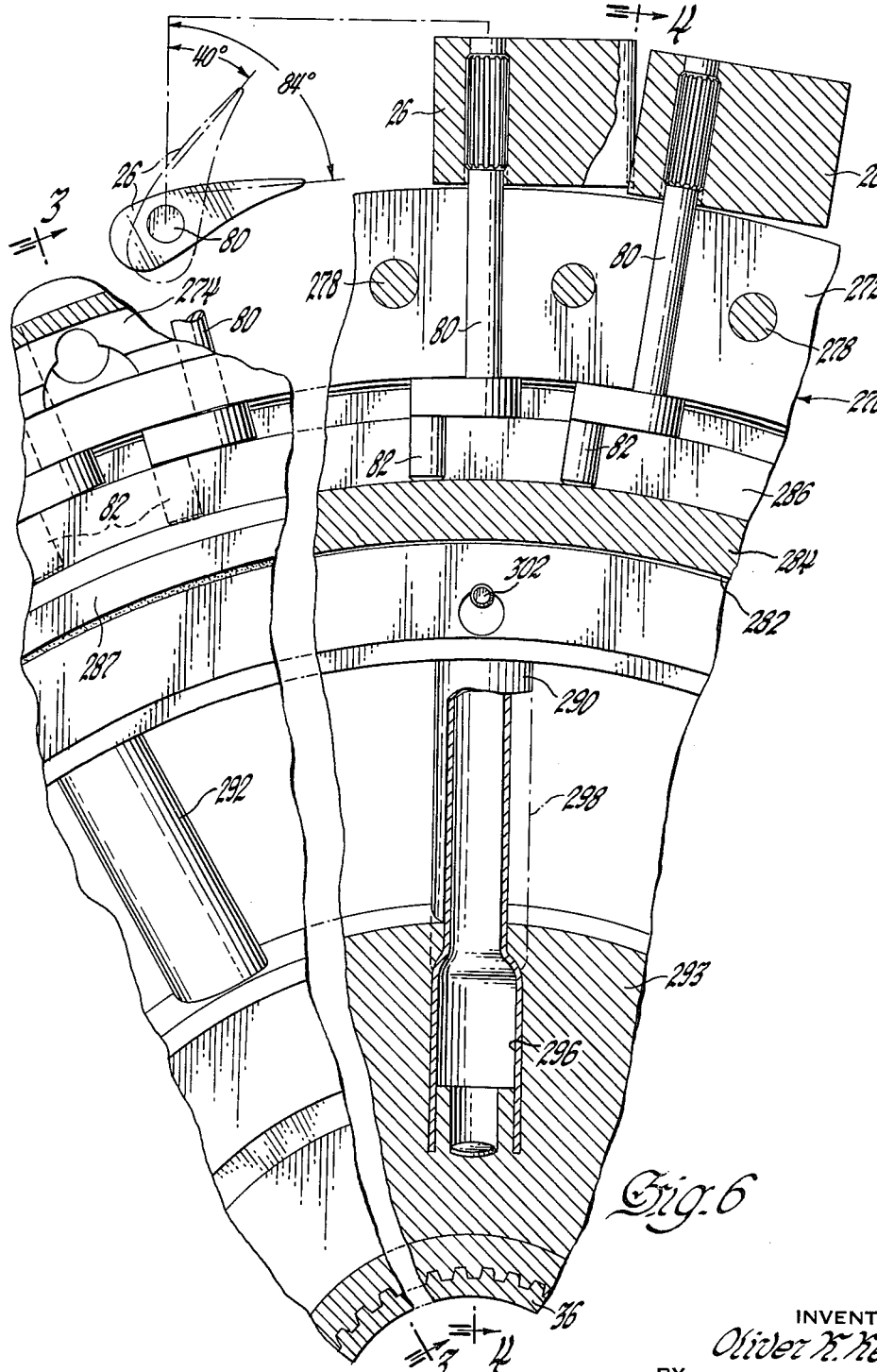
Figure 7:
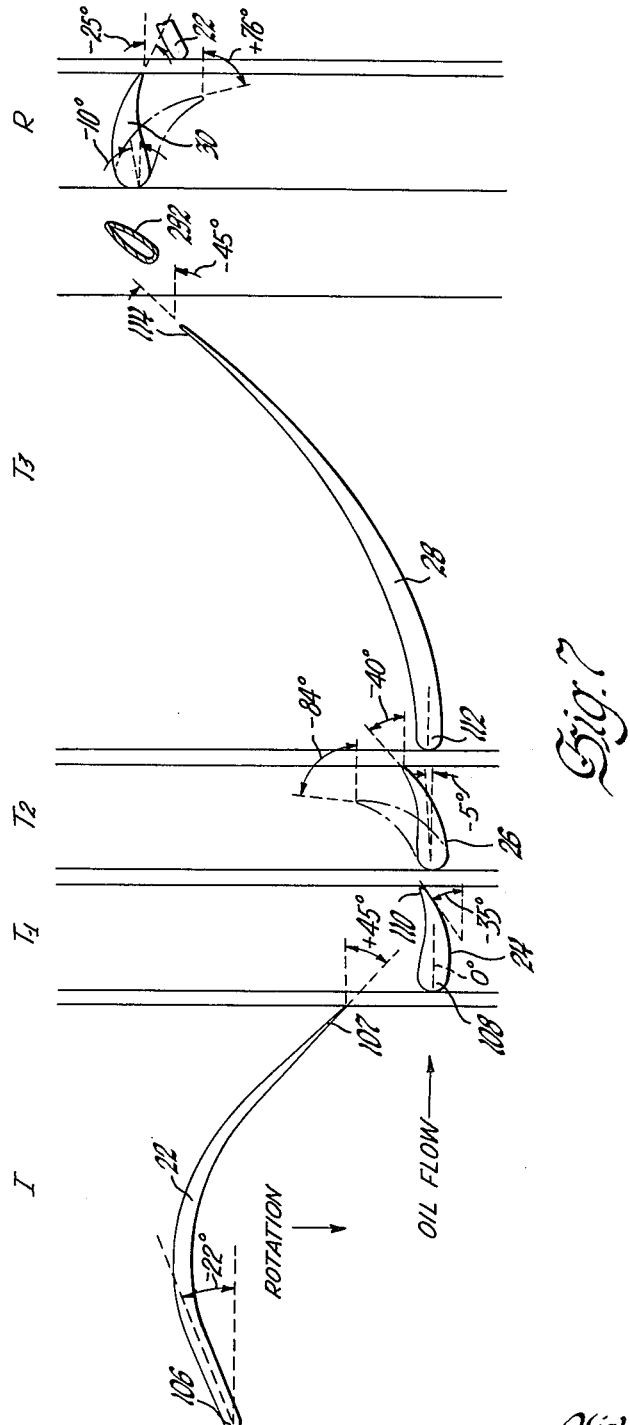
Figure 8:
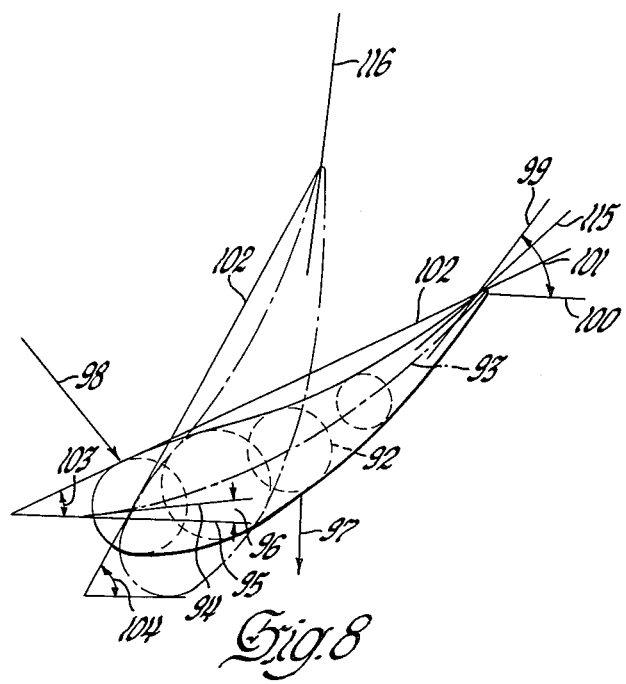
Figure 9:
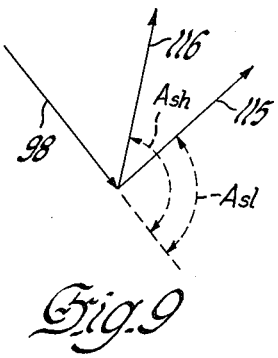
Figure 10:
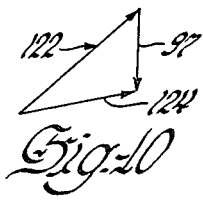
Figure 12:
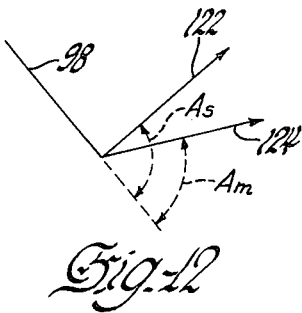
Figure 11:
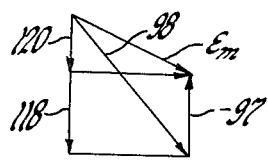

The foregoing and other objects and advantages of the invention will be apparent from the annexed description and from the accompanying drawings, in which:

FIG. 1 is a schematic longitudinal section of a transmission embodying one form of my invention, FIGS. 2, 2a and 2b collectively form one-half of a symmetrical longitudinal section of the actual structure of a transmission embodying one form of my invention, FIG. 2 being a section of the torque converter, FIG. 2a being a section of the gearing driven by the torque converter and a neutral clutch, and FIG. 2b being a section of the fiinal driven shaft and a brake, FIG. 3 is an enlarged section of a portion of FIG. 2 showing part of the structure which supports and controls a variable pitch turbine, this figure being an enlarged section on the line 3—3 of FIG. 6, FIG. 4 is a section like FIG. 3, being an enlarged section on the line 4—4 of FIG. 6, but showing a different spoke of the turbine supporting and controlling mechanism, FIG. 5 is a section on the line 5—5 of FIG. 4, FIG. 6 is a fragmentary view of the variable pitch turbine, partly in elevation and partly in section on the line 6—6 of FIG. 2, FIG. 7 is a diagrammatic developed view of the sections of the blades of the torque converter, FIG. 8 is a diagrammatic section of one of the turbine blades to illustrate nomenclature, FIG. 9 is a vector diagram of oil flow with respect to a stationary turbine blade both in low performance and high performance positions, FIGS. 10, 11 and 12 are vector diagrams showing the ow relationships around a moving turbine blade, FIGS. 13 and 13a together constitute a schematic hydraulic control diagram for a transmission shown in the preceding figures, FIG. 14 is a diagrammatic representation of the torque characteristics of a torque converter embodying my invention.

GENERAL DIAGRAMMATIC ARRANGEMENT

Referring to FIG. 1, the transmission includes in general an input shaft 10 driving a hydrodynamic torque converter 12 which in turn drives planetary reduction gearing 14 which can be connected to a final drive shaft 16 by a neutral clutch 18. The final drive shaft may have a brake 19. The construction and arrangement of the torque converter as well as the construction and arrangement of the reduction gearing separately and in combination are believed to include novel features.

The torque converter includes a pump or impeller I of generally known form, represented diagrammatically in FIG. 1 by a single blade 20, rotated by the input shaft 10 and circulating working liquid in a closed toroidal path, the center line of which is represented by the dotted line 22 in FIG. 1.

In my invention I include a first turbine $T_1$ represented in FIG. 1 by a single blade 24, a second turbine $T_2$ represented by blade 26, a third turbine $T_2$ represented by blade 28 and a reaction member R, represented by blade 30. The liquid from the pump I flows successively through $T_1$, $T_2$, $T_3$ and R.

The first turbine $T_1$ is connected to shaft 34 to drive a rear input sun gear 35 of the planetary gearing. The second turbine $T_2$ is connected to shaft 36 to drive a front input ring gear 37, which can also be braked to ground by a reverse brake 38. The third turbine $T_3$ is connected by shaft 39 to drive front and rear carriers 40 and 42, which respectively support front planetary pinions 44 meshing with the front input ring gear 37, and rear planetary pinions 46 which mesh with the rear input sun gear 35. The shaft 39 forms the principal drive shaft of the transmission and through the carrier 46 is connected to the transmission output shaft 56 which drives the final drive shaft 16 through clutch 18. A reaction ring gear 58, meshing with planet pinions 46 completes the rear planetary unit of the reduction gear, and a reaction sun gear 60, meshing with the front planet pinions 44, completes the front planetary unit.

The rear reaction ring gear 58 is connected to a ring member forming the hub or inner race 62 of an inner one-way clutch of torque transmitting device having one-way ratchet members, such as sprags or rollers 64, mounted inside of an intermediate ring member or hub 66, which forms the outer race for members 64, and also forms a hub or inner race for an outer one-way clutch or ratchet device having outside one-way torque transmitting members such as sprags or rollers 68 within an outer ring member or race 70 which can be held against rotation by a forward drive brake 72. The intermediate race 66 is connected to the front reaction sun gear 60, and may be formed integral with it. The arrangement of the one-way clutches is such that when the forward drive brake 72 is set, the hub 66 and the reaction sun gear 60 are prevented from turning backward by the rollers 68, and the hub 66 and rollers 64 in turn prevent the race 62 and reaction ring gear 58 from turning backward. In one condition of operation the ring gear 58 turns forward while the reaction sun gear 60 is held stationary, and under another condition both the ring gear and sun gear turn forward. Under another condition of operation, e.g., reverse drive, the front sun gear 60 is positively driven backward by the rear ring gear 58, the forward brake 72 being released, as will be explained.

The term one-way clutch or over-running clutch is used herein in its generally accepted engineering sense to mean any device between two coaxial relatively rotatable members which permits the first, or one of the members to rotate in one sense with respect to the second or other member but prevents the first member from rotating in the opposite sense with respect to the second. If the first member tends to rotate in the opposite sense with respect to the second member, the clutch locks the two members together. This device is sometimes called a free wheeler. If one of the members cannot rotate, the device becomes a one-way brake, a term used herein to denote a species of one-way clutch. This nomenclature is used to avoid the confusion sometimes encountered in the definitions of one-way brake and one-way clutch. In the structure described herein the free-wheelers 62–64–66 and 66–68–70 are both generically one-way clutches. Both free-wheelers 66–68–70 and 62–64–66 always function as the species one-way brake when the forward brake 72 is set. However, when the forward brake 72 is released, and the reverse brake 38 is set, the ring gear 58 drives the sun gear 60 through the free wheeler 62–64–66, which functions as a one-way clutch generically or as a drive clutch, but not as a one-way brake specifically.

Operation of general arrangement

The structure as so far described operates as follows:

Assume that the input shaft 10 is driven by the engine of an automobile whose propeller shaft is the final drive shaft 16, that the neutral clutch 18 is engaged, and that the car is at rest.

For forward drive the brake 72 is set, the reverse brake 38 being released. On starting, the inertia of the car holds the carriers 40, 42 and turbine $T_3$ stationary. Oil from the pump I (rotated at suitable speed) exerts torque on $T_1$ to drive the rear input sun gear 35 forward. Since the rear carrier 42 is momentarily held stationary, the rear pinions 46 attempt to drive the rear reaction ring gear 58 backward. This is prevented by brake 72 and the two one-way brakes 70–68–66 and 66–64–62. Consequently, ring gear 58 acts as a reaction gear and the pinions 46, driven by sun gear 35, walk around inside the ring gear to rotate the carrier 42 and output shaft 56 forward at a slower rate than the rotation of the sun gear, thus multiplying the torque supplied by the turbine $T_1$. This motion also positively drives the turbine $T_3$ forward, regardless of the hydraulic conditions in the torque converter. It will be observed that $T_1$ while exerting its positive drive, necessarily runs faster than output shaft 56 by an amount represented by the ratio of the rear planetary gear set.

In addition, oil flowing from $T_1$ to $T_2$ exerts torque on $T_2$, which through shaft 36 drives the front ring gear 37 forward, tending to rotate the front pinions 44 forward and, when ring 46 rotates fast enough, tending to rotate the front sun reaction gear backward. This is prevented by the outer one-way brake 70–68–66, and in fact, the front sun gear has previously been locked by the rear reaction ring gear 58 and the two one-way brakes. Consequently, the front ring gear 37 adds the torque of $T_2$, multiplied by the ratio of the front planetary unit to the transmission output shaft 56 by walking the front pinions around the front reaction sun gear 60, driving carrier 40 forward at reduced speed equal to the ratio of the front planetary gear set.

On starting the car, and below some definite speed depending on the design of the blades of the torque converter, the third turbine $T_3$ does not exert any positive or forward torque derived from hydraulic action but, as previously stated, it is positively driven by the carriers. However, at some definite speed ratio of input shaft to output shaft, positive hydraulic torque is impressed on $T_3$ and its speed due to hydraulic action tends to exceed the speed of the carriers driven by the other turbines. At this point $T_3$ assists in driving the car by torque exerted on the main drive shaft 39–56.

As the speed of the car progressively increases from stand-still two things happen successively. First, the torque delivered to the output shaft by $T_1$ through the rear planetary unit drops to a vanishing point as $T_1$ reaches its terminal speed. When the speed of $T_1$ multiplied by the ratio of the rear planetary unit becomes less than the speed of $T_2$ multiplied by the ratio of the front planetary unit, $T_2$ is driving the carriers faster than $T_1$ can drive them and the inner free-wheeler 66–64–62 breaks away, the rear reaction ring gear 58 rotates forward and $T_1$ idles in the oil stream. $T_2$ is now driving the car, assisted by $T_3$. Second, upon further increase in the speed of the car $T_2$ reaches its terminal speed and can no longer drive the carriers through the front planetary as fast as $T_3$ which is directly connected to them. $T_3$ then drives the carriers faster than $T_2$ can drive them. At this point the outer free-wheeler 70–68–66 breaks away, the sun gear 60 turns forward and $T_2$ idles in the stream of the oil.

For reverse drive, forward brake 72 is released and reverse brake 38 is set to hold front ring gear 37 to act as a reaction gear. Incidentally, this holds $T_2$ stationary during all reverse drive. Now $T_1$ drives rear input sun gear 35 forward, which because the carrier 42 is initially held by the stationary car, drives the rear ring gear 58 backward, and through the inner one-way clutch 66–64–62 tends to drive the front sun gear 60 backward. This is permitted in fact, for although the outer one-way clutch 70–68–66 tends to lock, its race 70 can turn backward, being unopposed by the brake 72. Consequently the front sun gear 60, rotating backward, walks the front pinions 44 backward around the ring 37, now acting as a reaction gear, and the carrier 40 is rotated slowly backward, driving the car backward and carrying the turbine $T_3$ positively backward. In fact, it is possible, depending on blade design, for the turbine $T_3$ to have reverse torque impressed on it hydraulically, in which case it will assist in driving the car backward. The turbine $T_2$, being held stationary in reverse drive, can act as a guide wheel or reaction member, directing oil from $T_1$ to the front sides of the $T_3$ blades, causing them to tend to drive the carriers backward. This will be explained in detail below.

In order to provide different values of torque multiplication for different driving conditions I make the angles of the reaction blades 30 adjustable and also make adjustable the blades of one or more of the turbines, for example $T_2$ in the embodiment of the invention described herein. For this purpose each $T_2$ blade 26 is fixed to a rotatable shaft 80 having a crank arm 82 and each reaction blade 30 is fixed to a rotatable shaft 84 having a crank arm 86. Suitable operators described below position the cranks to hold the blades at the desired angles. The stator is mounted on a suitable support, to be described, having any known one-way brake represented by ratchet members 88 supported on a stationary tube 90 so as to permit forward rotation but prevent backward rotation, as is known.

FIG. 7 shows diagrammatically the relationship of the blades to one another, this figure being a developed or unrolled diagram of the cross sections or traces of the blades on a cylindrical surface representing the flow of oil corresponding to the line 22 in FIG. 1. The blades are represented as moving from the top toward the bottom of the drawing, as shown by the rotation arrow in FIG. 7. Oil flows from left to right as shown by the oil flow arrow.

Angle of incidence, as the term is usede herein refers to the relationship of the blade to the structure of the rest of the torque converter, and does not refer to the constantly changing direction of flowing oil as measured with respect to the blade.

The angle of incidence of a blade is the angle formed between a plane determined by the axis of the transmission and a radial line passing through the nose, and a plane tangent at the nose to the camber surface of the blade. The camber surface is that curved surface determined by the axes of all circular cylinders which can be placed within the blade so that each cylinder is tangent to both side surfaces of the blade. In FIG. 8 the sections of such cylinders are indicated at 92, the trace of the camber surface is indicated by the dot-dash line 93, the trace of the tangent plane at the nose by 94 and the trace of the axial and radial plane through the nose by 95. The angle of incidence is the angle 96. Angles are measured between those portions of the planes extending from the intersection of the planes in the axial direction of oil flow, and the angle is considered positive when measured from the radial and axial plane in the direction the oil tends to move the blade. In FIG. 8 the angle 96 is measured from the line 95 opposite to the direction 97 in which the blade would move under the influence of oil flowing in the direction 98 and is therefore negative. The angle of incidence is about −8°.

Similarly the discharge angle is the angle formed between the plane tangent to the camber surface at the tail and the plane determined by the axis of the transmission and the radial line through the tail. In FIG. 8, the line 99 is the line tangent to camber line or trace of the camber surface at the tail, and 100 is the trace of the radial and axial plane through the tail. The angle of discharge is 101, and because this, too, is measured from the line 100 opposite to the direction of movement of the blade, the angle of discharge is negative, being about 44° when the blade is in the position shown by the full lines. The line 102 is the position line of the blade, that is the trace of the position plane, which is the position taken by a plane surface physically placed against the concave side of the blade. The angle of the position line is a convenient quantity to measure physically to determine the general angularity of the blade as a whole. Herein where I use the terms high angle and low angle referring to a blade as a whole, I mean that the position plane makes a large or small angle, respectively, with a radial and axial plane passing through the pivot of the blade. For example, in FIG. 8 the position angle of the blade in the full line position is 103 which is a relatively low angle. In the dash-dot line position, the blade has a relatively high position angle represented by 104.

In FIG. 7, each pump blade 22 may have a thin rounded nose 106 having an entrance angle of about −22° and a generally air-foil cross section terminating in a thin tail 107 having a discharge angle of +45°. This provides what I call a forward bend pump, by which I mean that the discharge edge of the pump blade is bent or inclined forward from the axis in the direction of rotation. This forward bend or positive discharge angle materially increases the tangential velocity of the oil, providing a forward or tangential velocity which is greater than the speed of rotation of the pump. The blade 24 of the first turbine $T_1$ has a thick rounded nose 108 whose angle of incidence is zero, and a generally air-foil cross section ending in a thin tail 110 having a discharge angle of about −35°. The blade 26 of the second turbine $T_2$ is similar in shape to the blade 24. When it is in the full line position of FIG. 7 (which as will be explained is low performance position) the blade 26 may have an incident angle of about −5° and a discharge angle of about −40°. When in dotted-line or high performance position the $T_2$ blade may have an incident angle of about −39° and a discharge angle of about −84°. The blade 28 of the third turbine $T_3$ has a rounded nose 112 thicker than the nose 106 of the pump blade and thinner than the nose 108 of $T_2$ blade; with an incident angle of zero. It has generally parallel sides converging into a thin tail 114 having a discharge angle of about −45°. The reaction blade 30 is generally similar in shape to the turbine blades 24 and 26 but is thicker and is reversed in direction, having when in full line position an incident angle of about −10°, and a discharge angle of about +25°. When in dotted line position or high performance position, the reaction blade has an incident angle of about +41° and a discharge angle of about +76°.

The torque which a turbine delivers is influenced by the velocity of oil striking the blades and by the angle in space through which the turbine blade deflects the oil. The angle in turn is influenced not only by the difference between the absolute direction in space of the incident oil and the exit angle of the blade itself, but also by the speed of the blade relative to the oil. The entrance angle of incidence of the blade itself does not importantly affect the angle through which the oil is turned. Oil strikes the blade influenced by the speed of the blade and by conditions upstream of the blade which are in a direction wholly independent of the shape of the blade, and it leaves the blade in a direction determined by the exit angle of the blade and the speed of its movement. The entrance angle is chosen to reduce shock loss or spatter of the incident oil, and so the incident angle affects the efficiency of the turbine but not its torque-multiplying characteristic.

The relationships of inflowing and outflowing oil with reference to a turbine blade, and the effect of these relationships on torque multiplication are shown in FIGS. 8–12. Referring to FIG. 8 which shows two positions of the blade 26 of turbine $T_2$, assume that this blade is at rest in the full-line position and that oil strikes it at a velocity whose speed and direction are represented by the vector 98. Oil will leave the blade in a direction tangent to the inner surface of the blade at the tail, represented by the direction of the line 115 in FIG. 8 which is different from the tangent to the camber line 99. In FIG. 9 the vector 98 and the discharge direction 115 have been repeated parallel to their respective positions in FIG. 7 to show the angle $a_{sl}$ through which the oil has been turned in space. When the blade is in the dotted line position of FIG. 8 oil will also leave the blade tangent to the inner surface at the tail, and this direction is indicated by the line 116, which is also plotted in its true direction in FIG. 9 to show the angle $a_{sh}$ through which the oil is turned. It will be observed that $a_{sh}$ is greater than $a_{sl}$. The blade has greater torque impressed on it by incident oil at velocity 98 when it is in the dotted-line position. Therefore, I refer to the full line position as low angle, meaning that when the blade is in this position the oil is turned through a relatively low angle. This is the low performance or low torque position. I refer to the dotted-line position as high angle, high torque or high performance position.

When the blade is moving less torque is impressed on the blade than when it is at rest. The reason for this is illustrated in FIGS. 10–12. Assume the blade is moving in the direction and at a speed represented by vector 97 in FIG. 8, and that the incident oil moves with an absolute velocity 98 as in FIG. 8. The velocity of the oil relative to the blade will be the vectorial difference of 98 and 97 or the vector $e_m$ in FIG. 11. This impresses less torque on the blade for two reasons. First, the tangential component of the velocity of the oil relative to the turbine is less when the turbine moves. The tangential component is the speed of the oil in a direction tangent to the circle of motion of the blade. With the blade at rest this component is the long vector 118 in FIG. 11, but with the blade in motion this component is the shorter vector 120. Second, the angle in space through which the oil is turned by the blade is less. In FIG. 10 the direction of oil leaving the blade and relative to the blade may be represented by the vector 122 which is parallel to the line 115 in FIG. 8. The blade moves at speed represented by vector 97. The absolute velocity of the discharged oil is therefore the vectorial sum of 122 and 97 or the vector 124. In FIG. 12 the directions of the vectors 98, 122 and 124 are plotted to show that the angle $a_m$ through which oil is deflected by the moving blade is less than the angle $a_s$ through which it is deflected by the stationary blade.

Of course, if the absolute velocity of the entering oil changes, this changes the torque impressed on the turbine. The absolute velocity of oil leaving the pump, for example depends both on the speed of the pump and the tangential speed of oil entering the intake of the pump, which is influenced by the discharge angle of the stator blades. A given pump rotating at a constant speed can increase by a given amount the absolute speed of the oil, by which I mean speed regardless of direction. If the oil discharged by the stator into the pump has a high tangential speed in the direction of rotation of the pump, the oil discharged from the pump will have a correspondingly higher tangential speed and will impress more torque on the turbine than when the oil discharged by the stator has a low tangential speed.

FIG. 14 shows representative torque multiplication characteristics of the individual turbine blades in the assembled torque converter and the resultant characteristics of the torque converter as a whole. Torque multiplication or torque ratio is plotted as ordinates against output shaft speed in r.p.m. (and car speed in miles per hour) as abscissae for a given constant value of torque output by the engine. In this figure the designations $T_1$, $T_2$ and $T_3$ represent first turbine, second turbine and third turbine respectively, and the letters S designate the resultant torque ratio of the torque converter as a whole. The letters, L, M, H and R following the other letters indicate that the torque converter is in low performance condition, medium performance condition, high performance condition, and reverse respectively.

*Low performance range*

In the lower left hand corner of FIG. 14 the sloping solid line $T_1L$ shows, by way of example, typical torque ratios of the first turbine ($T_1$) when the torque converter is in low performance condition, that is when both the second turbine $T_2$ and the reaction member R have their blades at low angle. At stall, that is when the car is at rest, the turbine $T_1$ exerts a torque on the sun gear 35 approximately 1.5 times engine torque at a given intermediate degree of throttle opening. Assuming the throttle is not changed, as the car begins to move and its speed increases the torque impressed upon the turbine $T_1$ by the oil gradually decreases, as is well known, and this torque ultimately disappears because the turbine blade is placed at a relatively low angle, and as the car speed increases the point is soon reached at which there is substantially no change in direction of the oil by the $T_1$ blades, and consequently no torque imposed on them. This is known as the terminal speed. In the example illustrated the torque of $T_1$ may disappear at about 730 r.p.m. output shaft speed representing about 17 miles per hour in a typical car in which $N/V=42.5$, where $N$=revolutions per minute of the shaft and $V$=miles per hour of the car.

The solid line $T_2L$ shows the torque ratios of the second turbine $T_2$ on the assembled torque converter under the conditions related above in connection with $T_1$. At stall the torque impressed on $T_2$ is relatively low, being about 0.1 times engine torque. This is because the $T_1$ blades and $T_2$ blades are very nearly at the same angle and the $T_2$ blades change direction of the oil only slightly. As the car speed increases the hydraulic torque impressed on $T_2$ increases because $T_1$ rotates at a higher speed than $T_2$, as determined by the planetary gearing, and therefore as the rotational speed of $T_2$ increases oil is delivered from $T_1$ to $T_2$ with a greater tangential component relative to $T_2$, as will be apparent from FIGURES 10 and 11. Thus the hydraulic torque impressed on $T_2$ builds up to a maximum value which may be about 0.55 times engine torque, and it will be noted that the torque of $T_2$ is increasing while the torque of $T_1$ is decreasing. When $T_1$ reaches the point where it exerts no torque, the free wheel unit 62–64–66 breaks away, letting the ring gear 58 turn forward and letting $T_1$ float idly in the oil stream, for all practical purposes, out of operation. $T_2$ at this point receives oil at the velocity with which the oil leaves the impeller, and as the car speed increases the torque impressed upon $T_2$ gradually decreases, as is well known. Ultimately the speed of $T_2$ reaches a point where it does not change the direction of oil and the turbine exerts no torque. At this point of terminal speed the free wheel unit 66–68–70 breaks away and the turbine $T_2$ floats idly in the stream of oil. This point is indicated on the curve at 1300 r.p.m., slightly more than 30 m.p.h.

The solid line $T_3L$ shows the torque ratios of the third turbine $T_3$ under the foregoing conditions. At stall negative torque is impressed on $T_3$ because the blades of $T_2$ (held stationary by the wheels of the car) direct oil to the back sides of the blades 28 as will be apparent from FIG. 7. This negative value at stall may be 0.125 of engine torque, but as the car begins to move and the speed increases, the angle of the oil discharged by $T_2$ into $T_3$ has an increasingly greater tangential component in the direction of rotation and the negative torque impressed on $T_3$ gradually decreases and soon becomes positive. The torque of $T_3$ increases, in fact, to the point where $T_2$ breaks away and free wheels, at which time the torque of $T_3$ is approximately equal to engine torque and the coupling condition occurs. As stated above this may be at 1300 r.p.m. slightly about 30 m.p.h. Thereafter $T_3$ alone drives the car at one-to-one torque ratio (neglecting losses) and $T_1$ and $T_2$ idle.

The curve $S_L$ represents the total torque delivered by the torque converter. Each point on this curve is the algebraic sum of the torque multiplication effected by the turbines $T_1$, $T_2$, and $T_3$ each multiplied by the ratio of the gearing through which each of these turbines drives the output shaft 16.

The rear planetary gear set 35–46–58 shown in FIG. 1 may have a gear ratio of approximately 2.55 so that when the ring gear 58 is held the sun gear 35, and of course the first turbine, $T_1$ rotates 2.55 times as fast as the carrier 42 and the output shaft 16. The front planetary gear set 60–44–37 may have a ratio of about 1.6 so that when the sun gear 60 is held, the ring gear 37, and of course the second turbine $T_2$, rotate at 1.6 times the speed of the carrier 40 and the output shaft 16. The third turbine $T_3$ and the output shaft always rotate together. Thus at any speed the ordinate of the curve $T_1L$ multiplied by 2.55, plus the ordinate of the curve $T_2L$ multiplied by 1.6, plus the ordinate of the curve $T_3$ (taking into account its algebraic sign) is equal to the ordinate of the curve $S_L$. Therefore, at stall, although the turbine $T_3$ impresses negative torque on the output shaft, the entire torque converter has a high positive torque ratio because the negative torque is more than overcome by the high torque of the first turbine multiplied by its gear ratio. At stall the torque ratio of the torque converter overall is about 3.7 to 1. The torque ratio of the torque converter as a whole decreases as the car speed increases until at about 30 m.p.h. the torque ratio is substantially unity and coupling occurs. It will be observed that after about 30 m.p.h. the curves $S_L$ and $T_3L$ coincide, meaning that the first and second turbines are freewheeling and the third turbine alone is driving the car.

*Medium performance range*

While the torque converter operating as described provides a very satisfactory torque ratio at starting and low speeds it is sometimes desirable to increase the torque ratio throughout an intermediate speed range in order to provide satisfactory ability of the car to accelerate in conditions of heavy traffic. In order to increase the torque ratio of the transmission in the intermediate speed ranges, which may be considered to be between 15 and 40 m.p.h., the blades 26 of second turbine $T_2$ are placed at high angle, for example the dotted line position of FIG. 7. This is the medium performance condition of the torque converter as a whole and is caused by the high torque, or high performance position of the second turbine alone, in which the oil is turned through a higher angle than before by the $T_2$ blades. In this position, as explained in connection with FIGS. 8–12, the torque ratio of $T_2$ is increased to the values shown by the broken line $T_2M$ in FIG. 14. This shows, for example, that in the high angle position the second turbine $T_2$ has about 2.5 times as much torque at stall as it does in the low angle position. The torque increases with increasing car speed until a value of about 0.8 is reached, as compared with 0.55 in the low angle position. Likewise the torque supplied by the second turbine continues throughout a longer range of car speed until a much higher car speed is reached, lasting until about 50 m.p.h. in the high angle position, as compared with about 30 m.p.h. in the low angle position. These torque values are multiplied by 1.6 and add to the torque supplied by the other turbines to the output shaft 16.

The first turbine $T_1$ has its torque characteristics changed slightly, but not importantly, by the movement of the second turbine $T_2$ to high angle position. In FIG. 14 the broken line $T_1M$ shows the torque ratio curve of the first turbine under these conditions.

The torque delivered by the third turbine in the medium performance condition is reduced as compared to the low performance condition. At stall there is a higher negative torque on the third turbine $T_3$ and it requires longer for the third turbine to reach coupling. This condition is represented by the broken line $T_3M$. It will be observed that this torque begins at about –.35, as compared with about –.25 at stall in the low performance range and that coupling is reached at about 50 m.p.h., as compared with about 30 m.p.h. The increased negative torque on $T_3$ is due to the fact that $T_2$ at high angle directs oil to the backside of the blades of $T_3$ in a direction having a higher tangential component than in low performance range, and due to the high angle of the $T_2$ blades it requires a higher car speed before the oil flowing from $T_2$ strikes $T_3$ in the forward direction. As seen from FIG. 14 this occurs at about 15 m.p.h., as compared with about 7 m.p.h. in the low performance range. However, due to the 1.6 gear ratio of the second turbine the torque ratio curve of the transmission, as a whole, is raised and is represented by the broken line $S_M$. The torque under these conditions at stall may be slightly lower than the stall torque under low performance condition but the difference is not significant. This higher torque of the transmission as a whole continues to about 51 m.p.h. when coupling is reached, as compared with about 30 m.p.h. in the low performance range. At speeds above 51 m.p.h. the curves $S_M$ and $T_3M$ coincide on the coupling line.

*High performance range*

It is desirable to provide still high torque multiplication over a still longer range of car speed for some conditions of drive, for example for hill climbing and passing other cars at relatively high speed. In order to provide this third or higher performance range the $T_2$ blades are continued in the high angle position of the medium performance range, and the stator blades are placed at high angle. The placing of the stator blades at high angle increases the torque of $T_1$ so that at stall $T_1$ provides about 1.7 times engine torque, and the torque of $T_1$ does not fade out until about 26 m.p.h. This is shown by the dash-dot line $T_1H$. Theoretically the torque provided by $T_2$ should also be increased by placing the stator blades in high angle, up to the point where the high angle restricts the flow of oil. This occurs here, and the torque of $T_2$ is reduced slightly at stall as shown by the dash-dot line $T_2H$. However, the torque of $T_2$ in the high performance range increases slightly above its maximum in the medium performance range and lasts to a higher car speed. The torque of $T_3$ is raised slightly at stall and it requires slightly longer for $T_3$ to reach coupling but this change is not significant in amount, and for all practical purposes the torque value of $T_3$ may be considered to be the same both under medium performance and high performance conditions.

The algebraic sum of the ordinates of the curves $T_1H$, $T_2H$ and $T_3H$ each multiplied by the appropriate gear ratio gives a resultant torque multiplication curve $S_H$. It will be observed that this provides a torque ratio of approximately 4.3 at stall, that the torque ratio remains above 1.5 up to a speed of about 25 m.p.h. and that it does not decrease to coupling until about 55 m.p.h. Consequently, at any car speed below about 50 m.p.h. the ability of the car to accelerate can be increased by changing the second turbine from low angle to high angle and this acceleration ability can be still further increased by changing the stator from low angle to high angle.

*Reverse*

In reverse the second turbine $T_2$ is held stationary as explained above, and preferably the control system is arranged so that the $T_2$ blades are always in high angle. $T_1$ provides torque comparable to the line $T_1M$ in FIG. 14 but this is reversed by the reversing gear and is represented by the line in FIG. 14 marked "Reverse of $T_1R$." Also in reverse $T_1$ runs slower with respect to the output shaft than it does in forward, because the reverse gear has a ratio of about 1.8 to 1 as compared to the forward ratio of about 2.55 to 1. In these conditions this torque curve has a different slope, and does not become zero until about 1235 r.p.m. output shaft speed. The torque curve of $T_1$ in reverse, as multiplied by the gear ratio is represented in FIG. 14 by the line marked "geared $T_1R$." To this is added the torque on $T_3$, which FIG. 14 shows to be about .45 at stall, so that the total torque multiplication of the transmission in reverse is about 3.0 at a particular throttle opening. Throughout the entire operation in reverse $T_2$ is stationary and acts as a guide or reaction member, directing oil to the back sides of the blades 28 of $T_3$, at an angle of incidence which is about $-84°$, as illustrated in FIG. 7. This angle of incidence remains constant and maintains a reverse torque on $T_3$ as long as the transmission operates in reverse. Because $T_2$ does not move, the hydraulic torque on $T_3$ will not drop off as rapidly as it does when the transmission is in forward drive. The torque will drop off solely due to the movement of $T_3$ as is known, and as is explained above in connection with FIGS. 8-12 and would not become zero until a theoretical speed of about 2600 r.p.m. is reached. This torque is represented by the line $T_3R$ in FIG. 14. The line SR represents the total torque multiplication of the transmission in reverse. At any point the ordinate of SR equals the sum of the ordinates of geared $T_1R$ and $T_3R$.

The axial flow turbines $T_1$ and $T_2$ each have terminal speeds considerably above the speed of the impeller. This is due to blade design and angle including the disposition of the turbine blades and the forward bend or positive discharge angle of the impeller, as shown in FIG. 7. For example, it is evident from FIG. 14 that when the propeller shaft has a speed of about 600 r.p.m., under a given set of conditions, the torque ratio of the torque converter as a whole is about 1.5, as shown by curve $s_1$. At this point the speed of the impeller may be about 1130 r.p.m., depending on the amount of slip in the torque converter, which in turn is influenced by blade design and overall efficiency of the converter. At this point $T_1$ is exerting torque on the car, and has not yet reached its terminal speed. At 600 r.p.m., output shaft speed, $T_1$ which is connected to the output shaft through a gear having a ratio of 2.55 is rotating at $2.55 \times 600$ r.p.m. or about 1530 r.p.m.

*Structural arrangement*

FIGS. 2–5 illustrate one form of actual structure embodying the invention and including the elements and their method of operation disclosed schematically above.

The structures of the impeller itself and of the first turbine, third turbine and reaction members themselves have been proposed by me and transmissions embodying these structures have been built and operated satisfactorily. This invention includes the second turbine $T_2$ arranged as shown diagrammatically in FIG. 1 and constructed as shown in FIGS. 2 and 3–6, and includes the structural relationships of all the parts of the torque converter to each other and to the rest of the transmission as is now described.

Referring first to FIG. 2, the engine shaft 10 is bolted to a flywheel 200 which is bolted to a torque converter casing including an impeller shell 202 and a front cover 204. The blades 20 are attached to the impeller shell 202 and to an inner shroud 205. The space between the shell and the shroud forms the path through the impeller for working liquid, as is known. At the center of its rear end, the impeller shell is riveted to a flanged tubular shaft 206 which drives any suitable oil pump 208 (herein called the front pump). The shaft 206 is surrounded by a seal 210 which prevents leakage of oil from the torque converter into the dry housing 212 which encloses the torque converter and forms part of the transmission casing 213. The shaft 206 is spaced from the stationary reaction sleeve 90 to form a passage 214 by which working oil may be supplied to the torque converter, as is known.

The first turbine $T_1$ includes an outer supporting shell 216 and an inner shroud 218 between which the blades 24 are fixed. The $T_1$ shell 216 is riveted at its center to flange 220 splined to the innermost shaft 34 which drives the rear sun gear 35 shown in FIGS. 1 and 2a. The flange 220 is provided with a number of openings 222 for equalization of pressure between opposite sides of the $T_1$ shell 216. The flange supports the front end of the shaft 34 and is itself supported for rotation by a radial bearing 223 and a thrust bearing 224 both in a collar 226 which is secured to the front cover 204, which in turn is supported at its center by the cap 228 which is slidably supported in a bore 230 in the engine shaft 10. The cap 228 completes the closed chamber of the torque converter formed by the seal 210, impeller shell flange 206, impeller shell 202 and front cover 204. The front cover 204 carries on its inner face a number of radial vanes 232 which rotate the liquid in the space between the cover 204 and the first turbine shell 216 at the same speed that the liquid is rotating within the working space of the torque converter and thus creates outside of the first turbine shell 216 a static centrifugal pressure which balances that within the torque converter. The collar 226 has openings 234 permitting oil to return from the torque converter to the system through a passage 236 in the shaft 34 under the control of a spring-loaded pressure responsive relief valve 238 which controls the pressure in the torque converter.

The third turbine $T_3$ has an outer shell 240 and an inner shroud 242 between which the blades 28 are fixed. The $T_3$ outer shell is riveted to a flange 244 splined to the tubular main shaft 39 which drives the carriers 40, 42 of both planetary gear units and the transmission output shaft 56. The reaction member, guide wheel or stator R which is placed between the outlet of turbine $T_3$ and the inlet of impeller I includes the adjustable vanes 30 fixed to the pivots or spindles 84 mounted between a reaction support 246 and an inner shroud 248. Each spindle 84 has a crank arm 86 disposed in an annular groove 250 in an annular piston 252 which divides a cylinder 254 in the support 246 into two pressure chambers 256 and 258. The pressure chamber 256 communicates with the working space within the torque converter and with the oil supply passage 214 between shaft 206 and sleeve 90. The pressure chamber 258 may be supplied with oil under pressure from the control system, to be described, through the passage 260 which communicates with the annular space 262 between the reaction sleeve 90 and the shaft 36 of the second turbine $T_2$. The position of the piston determines the position of the stator blades 30. The reaction support 246 is free-wheeled on the stationary reaction sleeve 90 by an overrunning brake including the sprags or rollers 88 riding on the inner race formed by the sleeve 90 and within an outer race 264 keyed to the reaction support in such a way as to permit hydraulic communication between the converter supply passage 214 and the pressure space 256. The brake 264–88–90 corresponds to the one-way brake 88 in FIG. 1 and permits forward rotation of the entire reaction assembly and prevents reverse rotation.

The blades 26 of the second turbine $T_2$ are each fixed to a shaft 80, previously described, journaled in an annular support 270 shown best in FIGS. 2–6.

The path of oil through the second turbine $T_2$ is between the surface 271 on the support 270, which surface forms an inner shroud or boundary, and the shell 216 of the first turbine $T_1$ (see FIG. 2). The support 270 includes a pair of mating halves 272 and 274 which meet at the surface whose trace in the plane of the paper is the dot-dash line 276 in FIG. 4, in which surface are located all the centers of the shafts 82. The halves 272 and 274 are held together, after assembly of the shafts and blades and the piston described below, by fastenings 278. The assembled halves 272 and 274 define an annular cylinder which is divided into two pressure chambers 280 and 282 by an annular piston 284 having an annular groove 286 in which lie crank arms 82, one on each shaft 80. The position of the piston, effected by pressures in the chambers 280 and 282, as will be described, determines the angle of the blades 26 of the second turbine $T_2$.

The cylinder 280–282 is completely closed by an annular cover 287 secured to the half 274 by fastenings 288. As shown in FIGS. 3–6 the support 270 is mounted on hollow radial arms 290 and 292, the inner ends of which are supported in hub 293 splined to the shaft 36 which drives the front input ring gear 37. The radial arms lie directly in the path of oil flowing from the third turbine $T_3$ to the reaction member R. Consequently the shape of that portion of the arms which lies in the path is streamlined to reduce turbulence, as shown in FIG. 5. Since $T_2$ always rotates faster than $T_3$ when the transmission is driving forward, the major axis 294 of the spokes 290 and 292 is given a forward lead and is placed at an angle to be as nearly parallel as possible to the direction of oil flow from $T_3$ to R over the most important operating range. This is shown in FIG. 7. The outer end 295 of each radial arm is circular and fits a circular hole in the support 270, and the inner end 296 is similarly fitted into a circular hole in the hub 288. Between the hub and the support 270 the arms 290 and 292 have the cross section and disposition shown in FIG. 5. In FIG. 6, which shows a section of the arm on the line 6—6 of FIG. 3 the dot-dash line 298 represents the position of the trailing edge 298 in FIG. 5 which has been cut away in FIG. 6.

As seen in FIG. 4, the hollow arm 290 forms a conduit for supplying oil under pressure to the pressure chamber 280. To effect this, the outer end 295 is blocked by a plug 300 held by a pin 302, and a hole in the wall of the tube 290 communicates with a passage 304 in the cover 287 leading to the space 280. At its inner end the tube 290 communicates through a passage 306 in the hub 293 with the space within the torque converter, so as to maintain at all times in the chamber 280 the pressure supplied to the converter by the passage 214 between the shaft 206 and reaction sleeve 90. The purpose of conducting oil from the center of the converter to the chamber 280 will be explained in the discussion of the control system.

As shown in FIG. 3, another radial arm 292 forms a passage for conducting oil under pressure from the control system to the pressure chamber 282. To effect this the outer end 295 of tube 292 is open and communicates with chamber 282, and the inner end communicates through a passage 308 in the hub 293 with the space 310 between the shaft 39 of the third turbine and the shaft 36 of the second turbine (FIG. 2). This space forms part of a control conduit, and is sealed from the pressure within the torque converter by seals 312. At its rear end the space 310 communicates through a hole 314 and gland 316 in shaft 36 with a control passage 318 in a stationary part of the transmission which leads to the control system to be described, so that when desired control pressure may be admitted to the chamber 282. The conduit formed by 314–316–318 is sealed from the rest of the system by seals 320.

As seen in FIG. 2a the second turbine shaft 36 may be formed integral with a drum 321 to which is attached the front input ring gear 37 and to which is splined a cone brake 322 which can move axially with respect to the drum 321. This brake is for the purpose of holding the ring gear 37 in reverse drive as explained above and corresponds to the brake 38 diagrammatically illustrated in FIG. 1. The exterior conical surface of the brake drum 322 cooperates with a conical surface 324 formed on the inside of the stationary casing 213 and the internal conical surface of the drum 322 is engaged by an external conical surface on a piston 326 which may be urged to the right, as seen in FIG. 2a, by oil under pressure within a chamber 328, as will be explained in the description of the control system following.

The shaft 34 which connects the first turbine $T_1$ to the rear input sun gear is supported for rotation in a radial bearing 342 in a bore in the end of the transmission output shaft 56, which in turn is supported by the casing 213 through intermediate parts to be described. The duct 236 in the shaft 34 has a connecting duct 346 which can transmit oil from the torque converter through the passage 234 (FIG. 2) in the collar 226 of the front cover 204 to various parts of the mechanism for lubrication, particularly radial bearing 342.

The hollow shaft 39 which is driven by the third turbine $T_3$, forms part of the direct drive mechanism from $T_3$ to the final drive shaft 16. This shaft 39 is connected to the rear carrier 42 in FIG. 1 and to the transmission output shaft 56. As seen in FIG. 2a this carrier and the connection to the output shaft are formed by a flange 350 which may be integral with the shaft 39, the planetary spindles 352 and the rear flange 354 which is splined to a flange 356 formed integral with the transmission output shaft 56. The front end of the shaft 56 is supported for rotation in the stationary casing 213 by a cylinder 358 fixed in the casing 213 and carrying at its inner part, a radial bearing 360 which supports a clutch drum 362 carrying a radial bearing 364 which supports for rotation the front end of the transmission output shaft 56, which in turn supports the radial bearing 342 and the rear end of the shaft 34.

The carrier 40 of the front planetary unit in FIG. 1 is formed by a front flange 366 splined to the shaft 39, the planetary spindles 368 and a rear flange 370.

The rear carrier spindles 352 have mounted thereon the planetary pinions 46 which mesh with the rear input sun gear 35 and with the rear reaction ring gear 58. The ring gear 58 is riveted to a flange 372 formed integral with the inner race 62 of the inner one-way brake or clutch which race is journaled on the third turbine shaft 39 by a radial bearing 376. The inner one-way device is completed by the one-way sprags or rollers 64 engaging the intermediate race 66, which in turn forms the inner race of the outer one-way brake having the spindles or rollers 68 engaging the outer race 70, keyed to a brake drum 386 having a conical brake surface which can be pressed against an outer stationary conical brake surface 388 by a piston 390 operable in the cylinder 358 by fluid pressure admitted to the pressure chamber 391 within the cylinder 358 when desired. The arrangement is such that when the piston 390 sets the brake 386 it positively holds the outer race 70 of the outer one-way brake which prevents reverse rotation but allows forward rotation of the intermediate race 66, which in turn prevents reverse rotation but allows forward rotation of the rear reaction ring gear 58. The front reaction sun gear 60 is attached to the intermediate race 66. The front planetary unit is completed by the planetary pinions 44 mounted on the spindles 368. Thus the brake 386–388 corresponds to the forward reaction brake 72 in FIG. 1, and as in FIG. 1 when this brake is set both the sun gear 60 and the ring gear 58 can rotate forward, but neither can rotate backward. Also, as in FIG. 1 when the brake 386–388 is released it permits the ring 58 to drive the sun gear 60 backward when the transmission is set for reverse.

The neutral clutch construction is shown in FIG. 2a and corresponds to the diagrammatic neutral clutch 18 in FIG. 1. This clutch includes an inner clutch drum 392 splined to the transmission output shaft 56 and having splined thereon driving plates 394 which are interleaved between driven plates 395 splined to the clutch drum 362 which latter is connected to a rear flange 396 formed integral with, or secured to, the final drive shaft 16 shown in FIG. 2b. The clutch may be engaged by a piston 398 operated by fluid pressure in a cylinder 400 supplied with oil through a duct 402 and may be released when there is no pressure in the cylinder 400 by a releasing spring 404.

The clutch drum 362 which is rigidly connected to the final drive shaft 16 may have any suitable parking brake represented by gear teeth 406 which may be engaged by any suitable locking device, not shown.

Referring to FIG. 2b an output shaft driven pump or rear pump 408 is splined to the final drive shaft 16 for supplying oil in response to movement of the vehicle for control and for lubrication of the transmission, as will be explained. The final drive shaft 16 may be supported for rotation at its front end by a radial bearing 410 in a support 412 secured to the casing 213, and may in turn support the rear end of the transmission output shaft 56 by the radial bearing 414. The rear end of the shaft 16 may be supported by any suitable radial and thrust bearing 416 and may have keyed to it any suitable driving connection for a propeller shaft such as the universal joint 418 which may carry a speedometer drive gear 420.

The final drive shaft 16 may be equipped with any suitable brake herein illustrated in FIG. 2b as including a drum 422 bolted to the casing 213 and having splined thereto brake discs 424 interleaved between brake discs 426 splined to a sleeve 428 keyed to the final drive shaft 16. The brake may be set by a piston 430 urged to the right by the pressure of fluid in a cylinder 432. The brake may be released when there is no pressure in the cylinder by springs 434 seated against an abutment 436 bolted to the casing 213.

CONTROL SYSTEM

The structure described above can be operated by any suitable controls which select the desired ranges such as forward and reverse and which place the turbine and stator blades in the desired positions, either manually or automatically. One example of controls embodying my invention is shown collectively and diagrammatically in FIGS. 13 and 13a.

In general this control system includes sources of control pressure, one operative when the engine is running, and one operative when the car is running forward; a manually operable selector valve for selecting forward, neutral, reverse and braking; a relay valve for preventing brake operation unless the throttle is closed; an automatic valve for placing $T_2$ in high angle in response to high torque demand on the engine; and a manual valve for placing the stator in high angle only after the throttle has been fully opened.

The source of pressure operative whenever the engine is running is the front pump 208 shown in FIGS. 2 and 13. This may be of the variable volume vane type and is designed to provide at its outlet a constant pressure, which pressure however, may be increased with increasing torque demand on the engine, for example as disclosed in FIG. 16 of British Patent 716,134, published September 29, 1954. The source of pressure operative when the car is running forward is the rear pump 408 shown in FIGS. 2b and 13a. This may be similar in construction and operation to the front pump, except that it provides a constant pressure above a predetermined minimum car speed, and this pressure is not modulated by any other influence. Referring to FIGS. 13 and 13a, both pumps take in oil from a common sump 450 and their outlets 452 discharge into a common chamber 453 to which is connected, through apparatus to be described, the converter supply passage 214 which corresponds to the passage 214 in FIG. 2 between shaft 206 and sleeve 90. Oil from the torque converter 12 passes to the lubrication conduit 236 (which is the bore 236 in the $T_1$ shaft 34 in FIG. 2) under the control of the pressure relief valve 238 which maintains the desired pressure below main line pressure in the converter. Oil enters the converter only through the restriction 454, which may be constituted by conduit 214 itself, so that the pressure in the converter does not rise above the desired value. The conduit 214 is connected to the chamber 453 both through a cooler 455 and a by-pass conduit 456 under the control of a pressure responsive by-pass or relief valve 457 which opens at a predetermined pressure to direct a portion of the oil around the cooler to the main control conduit 458 into which the cooler also discharges. The rear pump discharges to the chamber 453 and hence to main line 458 only through a check valve 459 so that it supplies oil to the system only when the pressure of the rear pump exceeds the pressure of the front pump, as is known, and the front pump cannot supply oil to that part of the control system intended to respond only to forward motion of the vehicle, as will be explained.

A manual selector valve 460 at the right FIG. 13 is supplied with control oil from the main line 458 at its inlet port 462. When the manual valve is in the position shown in FIG. 13, oil is supplied to the forward brake apply cylinder 391 by conduit 464 and to the neutral clutch apply cylinder 400 by line 466, thus conditioning the control system to drive the car forward. If the valve 460 is moved to the position indicated at N in FIG. 13, the land 468 in the center of the valve blocks the main line 458 and the left land 470 moves out of the valve casing to vent both cylinder lines, releasing forward brake and neutral clutch and placing the transmission in neutral. If the manual valve 460 is moved to the position indicated by R in FIG. 13 the land 470 is placed between lines 464 and 466, venting the forward brake line 464 but maintaining pressure in the neutral clutch line 466. Also the right hand land 472 is positioned in the end of the casing, closing the exhaust opening 474, and the land 468 has moved to the right to uncover a connection 478 which now conducts oil from the intake port 462 to a reverse brake apply conduit 476 connected to the reverse brake apply cylinder 328 of FIG. 2a. This conditions the transmission for reverse drive Whenever the manual valve is in any position other than neutral the central land 468 uncovers a connection 480 leading to a stator and brake control valve 482. This latter valve may be moved to the right as FIG. 13 is seen by the throttle pedal 484 against a restoring spring 486, and includes two spaced lands 488 and 490 between which, when the valve is in the closed throttle position shown in FIG. 13, the conduit 480 enters, and also between which is connected the conduit 262, shown in FIG. 2, leading to the high angle stator control cylinder 258. The arrangement is such that in all positions of the throttle pedal 484 between fully closed and fully opened throttle, the valve 482 does not affect communication between conduits 480 and 262.

The conduit 262 includes the space between shaft 36 and sleeve 90 in FIG. 2 and is connected to the low-angle stator control chamber 258. The high angle stator control chamber 256 is connected to the converter working space supplied by conduit 214, hence is represented diagrammatically in FIG. 13a as connected to conduit 214 which maintains converter pressure in chamber 256. Whenever the throttle pedal is not beyond full throttle position, and when the manual valve is in any position other than neutral, the low angle stator control chamber 258 is filled at line pressure. The values of line and converter pressures and the areas of the piston faces in chambers 258 and 256 are such that line pressure always overcomes converter pressure to hold the stator blades 30 at low angle. Whenever the throttle pedal is moved past full open position, land 488 takes a position between conduits 262 and 480, cuts off the line pressure, and vents chamber 258. Converter pressure in chamber 256 then moves the blades 30 to high angle.

The $T_2$ control is shown in the upper left corner of FIG. 13. A turbine control valve 500 is urged to the left as FIG. 13 is viewed by a spring 502 and when in this position admits oil under pressure to the previously described conduit 310 (FIG. 2) and to the low angle $T_2$ control chamber 282 from a conduit 504 leading from the outlet 452 of the rear pump 408 at a point inside the check valve 459 so that the $T_2$ low angle control chamber is filled solely by the rear pump. As has been explained the $T_2$ high angle control chamber 280 is connected to the converter working space, hence is represented diagrammatically in FIG. 13 and 13a as connected to the converter charging line 214. The rear pump pressure, torque converter pressure, and piston areas of the chambers 280 and 282 are so related that whenever low angle chamber 282 is filled, the pressure in it overcomes the force in chamber 280 and the $T_2$ blades 26 are held in low angle. Whenever the valve 500 is moved to the right as FIG. 13 is viewed, the rear pump pressure in conduit 504 is cut off and chamber 282 is connected to exhaust port 506. When this occurs converter pressure moves the blades 26 to high angle.

I prefer to move the $T_2$ blades to high angle in response to torque demand on the engine. This is conveniently done in response to the pressure in the intake manifold, for example, by a pressure regulating valve 510 of any suitable known form which receives oil at line pressure from the front pump outlet 452 and delivers to a control conduit 512 oil at a pressure which is a function of the pressure existing in the engine manifold, and hence a function of torque demand. The pressure in conduit 512 is communicated to a control chamber 513 in $T_2$ control valve 500 located behind land 514 so that this pressure urges valve 500 to the right against spring 502. Whenever torque demand produces a predetermined pressure in the manifold, for example, six inches of mercury below atmospheric pressure, the pressure in conduit 512 overcomes spring 502 and moves valve 500 to the right so that land 514 closes conduit 504 and land 516 opens low angle control chamber 282 to exhaust port 506. As torque demand falls, pressure in conduit 512 decreases until a point is reached where spring 502 overcomes the control pressure and moves the valve to the left. Land 514 has a larger area than land 516 to provide positive movement of the valve 500 and prevent hunting, as is known. If desired the conduit 512 can be connected to the regulating mechanism of the front pump 208 to modulate line pressure in accordance with torque demand, as disclosed in the British Patent 716,134.

One suitable construction of the regulating valve 510 includes a stem having a pair of lands 518 and 520 spaced to provide a regulated pressure chamber 522 in communication with a pressure control chamber 524 by way of the duct 526 in land 520. The pressure regulating chamber 522 has an inlet 528 connected to the front pump outlet 452, an exhaust outlet 530, and a controlled pressure outlet 532 connected to the conduit 512. The valve is urged downward by a spring 534 to open inlet 528 and close vent 530, and is urged upwardly to close the inlet 528 and open the vent 530 by the force of the regulated pressure in chamber 524. A diaphragm 536 enclosing a pressure chamber 538 connected to the intake manifold of the engine subtracts from the force of the spring 534 an amount which is a function of manifold vacuum, and hence a function of torque demand. This is a well known device for maintaining in conduit 512 a pressure which is a function of torque demand.

The control system as so far described operates as follows: Assume the engine is running, the throttle is closed, the manual valve 460 is in neutral position and the car is at rest. The oil control supply is blocked at 462 by land 468 and the cylinders for the neutral clutch, forward brake, and reverse brake are all vented. There is no pressure from the rear pump 408 so that converter pressure $T_2$ high angle control chamber 280 moves the $T_2$ vanes 26 to high angle.

To start the car forward the manual valve is moved to the D position shown in FIG. 13. This energizes the neutral clutch and forward brake, conditioning the car for forward drive and filling the stator low angle control cylinder 258 to hold the stator in low angle. The $T_2$ in high angle tends to prevent creep of the car at closed throttle because the impeller speed is low, the $T_2$ blades tend to impose negative torque on $T_3$, and at high angle with $T_1$ at standstill they tend to reduce the volume of flow in the torque converter.

When the throttle is opened somewhat impeller speed increases, giving the oil striking $T_1$ a greatly increased forward tangential component and causing sufficient torque on $T_1$ to start the car in mid-performance range. At some predetermined low car speed the rear pump supplies sufficient pressure to the $T_2$ low angle control cylinder 282 to move the blades to low angle, and the car continues in low performance range unless the throttle is opened enough to cause the regulator valve 510 to shift the $T_2$ control valve 500. If that happens the $T_2$ blades are held in high angle. As car speed increases the turbines $T_2$ and $T_3$ successively take over the load as explained in connection with FIG. 14.

At any time when driving in low performance range, more torque multiplication (or car performance) can be had by opening the throttle enough to reduce manifold vacuum to the point where it increases $T_2$ control pressure in the line 512 to move the $T_2$ blades to high angle or high performance positions. This effects the medium performance range of the transmission.

At any time highest performance can be had by moving the throttle pedal beyond full-throttle position. This vents the stator low angle control cylinder 258 and places the stator in high angle. This effects high performance range. If, when operating with both $T_2$ and the stator at low angle, the throttle pedal is floored, $T_2$ moves to high angle as soon as manifold vacuum drops to the predetermined value and the stator moves to high angle as soon as its control valve is moved. These movements can be practically simultaneous.

While I rely on converter pressure in the $T_2$ high angle control chamber 280 to move the $T_2$ blades 26 to high angle position, I have found it advisable to conduct this pressure to the cylinder 280 from a point adjacent the center of rotation of the torque converter, this point being in communication with the space within the torque converter or with the torque converter supply conduit 214. The $T_2$ low angle control chamber 282 must necessarily be supplied with control oil from a conduit in the shaft arrangement at the center. Consequently, whenever the control pressure is released by the $T_2$ control valve 500, this relieves the pressure of the main line 458, but oil is trapped in the chamber 282 and its supply spoke 292, and because the chamber and spoke are rotating rapidly this creates a pressure in the chamber 282 due to centrifugal force. The pressure in a rotating body of liquid at any point due to centrifugal force is a function of the radius of rotation of the point and of the speed of rotation, and since the radius of rotation of the cylinder 282 is quite large this pressure can and does attain a high value. The $T_2$ high angle control cylinder 280 has the same radius of rotation as that of the low angle control cylinder 282 and one might suppose oil conducted directly into this cylinder from the rotating torque converter working space would have the same centrifugal pressure. However, the second turbine $T_2$ frequently runs faster than the pump. A body of oil confined in the torque converter between the pump shroud 205 and the cover 287 of the cylinder 280 does not rotate faster than the pump and may even rotate slower because of the smooth surfaces which confine the oil. The pressure of this oil is also a function of the radius of rotation at the point measured and the speed of rotation, and since this speed of rotation is frequently much less than the speed of rotation of the low angle control chamber 282, the centrifugal pressure alone in the chamber 282 is greater than the centrifugal pressure in the torque converter space. This condition sometimes prevents the $T_2$ from being placed in high angle unless precautions are taken to avoid it. By conducting the oil from the center of the torque converter chamber to a closed cylinder 280, I provide a quantity of oil in the high angle control cylinder which is always trapped in the cylinder 280 and spoke 290, so that this oil always rotates at the same speed as the oil in cylinder 282. Consequently, whenever control pressure is released in cylinder 282, the static centrifugal pressures in cylinders 282 and 280 exactly balance, and the piston 284 is operated solely by the converter charging pressure maintained in conduit 214. This assures that the blades will always be moved to high angle when the control pressure is released.

*Reverse*

To start the car from standstill in reverse the selector valve is moved to the R position, which as explained releases the forward brake, retains the neutral clutch engaged and engages the reverse brake. There is no pressure from the rear pump, and $T_2$ is at high angle. It remains in this position, with $T_2$ stationary throughout reverse drive, because the rear pump provides no pressure when running backward. Thus, the third turbine $T_3$ operates in a condition corresponding to the mid-performance range. High performance range can be had in reverse, as in forward, by flooring the throttle pedal, but this would never occur in practical operation unless the car encountered such resistance as to hold its speed to limits permitting control (for example, 10 miles per hour) with the throttle fully open.

*Braking*

The control system includes means for operating the coasting brake 19. The brake apply cylinder 432 is filled by oil under pressure from the main line 458 under the joint control of a brake pressure relief valve 550, a rear pump relay and pressure control valve 552, a brake relay valve 554, a throttle brake valve 556 (which may conveniently be incorporated in the stator control valve 482), and the manual valve 460. The brake cannot be set unless the manual valve is in braking position B in FIG. 13, and the throttle is closed and the car is moving forward.

When the manual valve is in B position the forward brake and neutral clutch remain energized, so that the car can be driven forward in the normal manner as long as the throttle is open slightly. When in B position the land 468 uncovers a brake control supply conduit 560, which is then supplied with control oil from the main line 458 at port 462. If the throttle is closed, as is shown in FIG. 13, this oil flows through chamber 562 of throttle brake valve 556 and through conduit 564 to the actuating chamber 566 of relay valve 554 to open this valve as is shown in FIG. 13a. This allows oil from the rear pump to flow from conduit 568 to conduit 570 which delivers it to the operating chamber 572 of the rear pump relay and regulating valve 552. If the car is moving forward above a predetermined minimum speed, pressure of the rear pump in chamber 572 opens the relay and regulating valve by moving the valve 573 to the left as FIG. 13a is viewed. This movement against a restoring spring 574 opens inlet 575 from main line 458 and closes exhaust port 576. This admits oil to conduit 578 leading to the coast brake and its apply cylinder 432.

As soon as oil is admitted at port 575 it flows through an opening 579a in land 579 and into pressure chamber 579b which causes the valve to move toward the right again. Such movement tends to close inlet port 575 and open slightly exhaust port 576. This causes the valve to alternate or hover between one position in which 575 is open and 576 is closed and another position in which 575 is closed and 576 is open. This regulates the pressure in conduit 578, as is known, to a value below the line pressure in conduit 458.

The coast brake is intended to operate normally at a pressure less than the pressure maintained by the regulating valve 552, and to effect this the brake pressure regulator valve 550 is connected to the conduit 578. This may be a pressure relief valve of any known form, for example including a throttle valve 580 connected between an inlet 582 which is connected to conduit 578 and an outlet 584. The valve is urged closed by a spring 586 and urged open by the pressure in the conduit 578.

This arrangement maintains transmission pressure in the line 458 and a lower brake operating pressure in the cylinder 432 while maintaining excess flow capacity in the line 578. The excess is passed through valve 580 to flow over the brake disks 424, 426 and any suitable cooler through conduit 584 before returning to sump 450.

It will be apparent that the entire braking system is rendered inactive by slight opening of the throttle in which case the valve 482 moves slightly to the right from the position shown in FIG. 13 and land 490 of the stator control valve 482 closes the braking control oil supply conduit 560 while the land 585 opens the brake control system to an exhaust port 588. Also, the brake control system is inactivated whenever the manual valve is in drive or neutral position, in either of which positions the land 468 of the manual valve prevents communication between the main line 458 and the brake control conduit 560. Although the brake control conduit 560 is filled when the manual valve is in reverse position, the brake system cannot operate because when the car is moving in reverse the rear pump furnishes no pressure and the rear pump relay valve 552 is closed preventing oil from the main line 458 from entering conduit 578 to supply the brake apply cylinder 432.

It is intended that the coast brake in general operation will either be fully off or fully applied by a constant force which is normally determined by the relief valve 550. However, it is contemplated that for city driving which may consist mainly of acceleration and deceleration, the car may be operated with the manual valve in brake position so that the coast brake will automatically assist in stopping the car whenever the throttle is closed. This makes it desirable to release the brake gradually on coming to a stop. For this purpose the rear pump relay valve 552 also acts as a pressure regulating valve for reducing the pressure in the brake apply cylinder 432. The rear pump provides a constant pressure whenever the car is running above a predetermined minimum speed, but as the car slows down below this speed the pressure supplied by the rear pump gradually decreases. It is intended that the pressure of the rear pump required to maintain normal braking pressure in conduit 578 will be something less than the constant pressure maintained by the rear pump above the minimum car speed. Therefore, I provide a restriction 587 in line 570 and a bleed opening 590 which provides a leak in the chamber 572. This maintains in this chamber a constant pressure which is a predetermined amount lower than the constant pressure of the rear pump when operating above the minimum car speed. Consequently, whenever the car slows down below this minimum speed, and after the pressure in the chamber 572 reaches the minimum required to maintain normal braking pressure in line 578, the valve 573 starts to close under the force of the spring 514 and pressure in the chamber 579b and reduces pressure in the brake apply cylinder 432 gradually as the car comes to a stop.

In order to maintain the effect of the bleed opening 590 constant and prevent its becoming clogged with dirt, I place a loose cotter pin 592 in the opening. Movement of the cotter pin due to vibration or car movement tends to keep any dirt from lodging in the opening and to maintain a constant effective size of the opening.

I claim:

1. A hydrodynamic torque transfer device including in combination a stationary casing enclosing rotary casing members which define a space for a body of fluid which is rotated in said space, the rotary casing members including a bladed impeller rotor and a bladed turbine rotor for circulating fluid in a torque transfer path within said space, one of said rotors being adapted to rotate at a speed different from the speed of rotation of said body of fluid, said last-mentioned rotor having blades which are adjustable to vary their angle with respect to the direction of fluid striking the blades, motor means adjacent the blades of and rotatable with the rotor having the adjustable blades, said motor means having a pair of expansible chambers and piston means moved by said expansible chambers to a plurality of positions, means connecting the piston means to the adjustable blades whereby the position of the piston determines the angle of the blades, a first conduit in the rotor having the adjustable blades for conducting control fluid under pressure from an inlet at the stationary casing to one of said expansible chambers, means for selectively supplying control fluid to said first conduit inlet, a second conduit in the rotor having the adjustable blades for conducting fluid from an inlet open to said space within the rotary casing members for receiving fluid under pressure from said space to the other expansible chamber, both said conduits having their inlets located at approximately the same radial distance from the center of rotation of the rotors.

2. The invention defined in claim 1 and said inlets being located closely adjacent the center of rotation of said members.

3. The invention defined in claim 1 and said one rotor at times rotating faster than said body of fluid.

4. The invention defined in claim 1 and said one rotor being said turbine rotor.

5. The invention defined in claim 1 and said motor means extending axially and said piston means moving axially.

6. The invention defined in claim 1 and means to supply fluid to said space and to regulate the pressure of the fluid in said space.

7. A torque transmitting device comprising in combination, a stationary casing enclosing rotary casing members which define a space for a body of working liquid which is rotated by the members, the members including a bladed impeller and a bladed turbine for circulating liquid in a torque transfer path within said space, means in the stationary casing for maintaining the working liquid under static pressure, the blades of the turbine being adjustable with respect to the direction of liquid striking the blades, said turbine including a control chamber, a piston dividing the chamber into opposing expansible chamber motors, first control means constantly urging the adjustable blades to one position, said first control means including a conduit rotatable with the turbine for delivering liquid to one motor from the body of working liquid through an inlet disposed adjacent the center of rotation of the turbine, and second control means for positioning the blades in another position, the second control means including a source of fluid under pressure in the stationary casing for maintaining a higher pressure than the static pressure of the working liquid and a conduit for conducting control fluid from said last-mentioned source of pressure to the other expansible chamber motor.

8. A torque transmitting device comprising in combination, a stationary casing enclosing rotary casing members which define a space for a body of working liquid which is rotated by the members, the members including a bladed impeller and a bladed turbine for circulating liquid in a torque transfer path within said space, means in the stationary casing for maintaining the working liquid under static pressure, the blades of the turbine being adjustable with respect to the direction of liquid striking the blades, said turbine including a control chamber radially remote from the center of rotation of the turbine, a piston dividing the chamber into opposing expansible chamber motors, a plurality of arms supporting said chamber from a central hub, first control means constantly urging the adjustable blades to one position, said first control means including a conduit in one of said arms delivering liquid to one motor from the body of working liquid through an inlet disposed adjacent the center of rotation of the turbine, and second control means for positioning the blades in another position, the second control means including a source of fluid under pressure in the stationary casing for maintaining a higher pressure than the static pressure of the working liquid and a conduit in another of said arms for conducting control fluid from said last-mentioned source of pressure to the other expansible chamber motor.

9. A torque transmitting device comprising in combination a stationary casing enclosing rotary casing members which define a space for a body of working liquid which is rotated by the members, the members including a bladed impeller and a bladed turbine for circulating liquid in a torque transfer path within said space, means in the stationary casing for maintaining the working liquid under static pressure, the blades of the turbine being adjustable so that their angles vary with respect to the direction of liquid striking the blades, said turbine including a control chamber radially remote from the center of rotation of the turbine, a piston dividing the chamber into opposing expansible chamber motors, a plurality of arms supporting said chamber from a central hub, first control means constantly urging the adjustable blades to high angle position, said first control means including a conduit in one of said arms delivering liquid to one motor from the body of working liquid through an inlet disposed adjacent the center of rotation of the turbine, and second control means for positioning the blades in low angle position, the second control means including a source of fluid under pressure in the stationary casing for maintaining a higher pressure than the static pressure of the working liquid and a conduit in another of said arms for conducting control fluid from said last-mentioned source of pressure to the other expansible chamber motor.

10. A torque transmitting device comprising in combination a stationary casing enclosing rotary members which define a space for a body of working liquid which is rotated by the members, the members including a bladed impeller and a bladed turbine for circulating liquid in a torque transfer path within said space, means in the stationary casing for maintaining the working liquid in said space under static pressure, the blades of the turbine being adjustable with respect to the direction of liquid striking the blades, said turbine including a control chamber radially remote from the center of rotation of the turbine, a piston dividing the chamber into opposing expansible chamber motors, a plurality of arms supporting said chamber from a central hub, first control means constantly urging the adjustable blades to one position, said first control means including a conduit in one of said arms delivering liquid to one motor from the body of working liquid through an inlet disposed adjacent the center of rotation of the turbine, and second control means for positioning the blades in another position, the second control means including a source of fluid under pressure in the stationary casing for maintaining a higher pressure than the static pressure of the working liquid, a conduit in another of said arms for conducting control fluid from said last-mentioned source of pressure to the other expansible chamber motor, and a manually operable valve for establishing or preventing communication between said last-mentioned source of supply and the last-mentioned conduit.

11. A torque transmitting device comprising in combination, an engine, a stationary casing enclosing rotary casing members which define a space for a body of working liquid which is rotated by the members, the members including a bladed impeller driven by the engine and a bladed turbine for circulating liquid in a torque transfer path within said space, means in the stationary casing for maintaining the working liquid under static pressure, the blades of the turbine being adjustable with respect to the direction of liquid striking the blades, said turbine including a control chamber radially remote from the center of rotation of the turbine, a piston dividing the chamber into opposing expansible chamber motors, a plurality of arms supporting said chamber from a central hub, first control means constantly urging the adjustable blades to one position, said first control means including a conduit in one of said arms delivering liquid to one motor from the body of working liquid through an inlet disposed adjacent the center of rotation of the turbine, and second control means for positioning the blades in another position, the second control means including a source of fluid under pressure in the stationary casing for maintaining a higher pressure than the static pressure of the working liquid, a conduit in another of said arms for conducting control fluid from said last-mentioned source of pressure to the other expansible chamber motor, and a valve operable in response to torque demand on the engine for establishing or preventing communication between said last-mentioned source of supply and the last-mentioned conduit.

12. A hydrodynamic torque transmitting device comprising in combination rotary members determining a toroidal path for working liquid including a radial inflow turbine and a radial outflow impeller which circulates liquid to the radial inflow turbine which returns the liquid to the impeller, a bladed axial flow turbine between the outlet of the impeller and radial flow turbine, fluid pressure operated means on the axial flow turbine for adjusting the blades thereof, a hub located radially inside the path of liquid flowing from the radial inflow turbine to the impeller, hollow spokes of stream-lined cross section extending through said last-mentioned path and supporting the axial flow turbine from the hub for conducting fluid under pressure from the hub to the blade adjusting means.

13. In a transmission which includes a hydrodynamic torque converter; the combination of drive means, driven means, a bladed impeller member driven by said drive means and which circulates fluid, a bladed turbine member driving said driven means and which is rotated by the circulating fluid, a bladed reaction member redirecting the circulating fluid, mounting means operatively connecting the blades of one of said members and said one member for changing the angular positions of the blades of said one of said members to change the direction of flow of the circulating fluid, movable adjusting means operatively connected to said changeable blades for determining the positions of said changeable blades to vary the range of increased torque from the impeller to the turbine, control means operatively connected to said movable adjusting means and said driven means for normally positioning the adjusting means to provide one range of increase of torque during a range of forward motion of the driven means and operative during the absence of forward motion of the driven means for positioning the adjusting means to provide a higher range of increase of torque.

14. The invention defined in claim 13 and further control means for positioning the adjusting means to provide a higher range of increase of torque during said range of forward motion of the driven means.

15. Apparatus as defined in claim 13 including means responsive to a predetermined forward speed of driven means for restoring the normal range of torque ratios.

16. Apparatus as defined in claim 13 having a fluid pressure operated means for positioning the adjusting element to provide a higher torque transmitting relation, and means responsive to forward motion of driven means for providing a source of fluid under pressure for adjusting means.

17. Apparatus as defined in claim 13 having a fluid pressure operated means for positioning the adjusting element to provide a higher torque transmitting relation, and means responsive to forward motion of driven means above a predetermined speed for providing a source of fluid under pressure for the adjusting means.

References Cited by the Examiner

UNITED STATES PATENTS

| | | | |
|---|---|---|---|
| 1,900,120 | 3/1933 | Lysholm et al. | 60—54 |
| 2,085,030 | 6/1937 | Larson | 192—.072 |
| 2,117,673 | 5/1938 | Lysholm | 60—54 |
| 2,259,810 | 10/1941 | Freeman | 192—.072 |
| 2,292,482 | 8/1942 | Roche | 74—731 X |
| 2,416,948 | 3/1947 | Pavlecka | 60—54 |
| 2,418,378 | 4/1947 | Voytech | 74—761 |
| 2,612,755 | 10/1952 | Szczeniowski | 60—54 |
| 2,689,490 | 9/1954 | Holdeman | 74—761 |
| 2,718,796 | 9/1955 | Gautier | 74—677 |
| 2,749,777 | 6/1956 | Simpson | 74—761 |
| 2,762,238 | 9/1956 | Baker | 60—54 X |
| 2,795,154 | 6/1957 | Russell | 74—677 |
| 2,855,803 | 10/1958 | Knowles | 74—677 |

FOREIGN PATENTS 919,360  11/1946  France.

JULIUS E. WEST, *Primary Examiner.*

S. SPINTMAN, DON A. WAITE, BROUGHTON DURHAM, *Examiners.*

J. SHUSTER, T. C. PERRY, *Assistant Examiners.*